United States Patent
Harakawa et al.

(10) Patent No.: US 6,809,492 B2
(45) Date of Patent: Oct. 26, 2004

(54) SPEED CONTROL DEVICE FOR AC ELECTRIC MOTOR

(75) Inventors: Masaya Harakawa, Tokyo (JP); Tetsuaki Nagano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/311,229

(22) PCT Filed: Jul. 13, 2001

(86) PCT No.: PCT/JP01/06098
§ 371 (c)(1),
(2), (4) Date: Jan. 13, 2004

(87) PCT Pub. No.: WO03/009463
PCT Pub. Date: Jan. 30, 2003

(65) Prior Publication Data
US 2004/0135533 A1 Jul. 15, 2004

(51) Int. Cl.⁷ ............................................. H02P 21/00
(52) U.S. Cl. ..................... 318/609; 318/610; 318/812; 318/603
(58) Field of Search .................................. 318/603–610, 318/800–812, 432, 434; 363/37, 39

(56) References Cited

U.S. PATENT DOCUMENTS

| | | | |
|---|---|---|---|
| 4,280,085 A | * 7/1981 | Cutler et al. ................. | 318/803 |
| 4,801,856 A | * 1/1989 | Wajima .................. | 318/568.22 |
| 5,119,003 A | * 6/1992 | Lin et al. ..................... | 318/561 |
| 5,235,503 A | * 8/1993 | Stemmler et al. ............. | 363/37 |
| 5,481,168 A | * 1/1996 | Mutoh et al. ................ | 318/432 |
| 5,583,406 A | * 12/1996 | Mutoh et al. ................ | 318/376 |
| 5,650,700 A | * 7/1997 | Mutoh et al. ................ | 318/432 |
| 6,407,531 B1 | * 6/2002 | Walters et al. .............. | 318/805 |

FOREIGN PATENT DOCUMENTS

| JP | 9-201100 | 7/1997 |
|---|---|---|
| JP | 11-308900 | 11/1999 |
| JP | 2000-92899 | 3/2000 |
| JP | 2001-120000 | 4/2001 |

* cited by examiner

*Primary Examiner*—Paul Ip
(74) *Attorney, Agent, or Firm*—Sughrue Mion, PLLC

(57) ABSTRACT

A speed control apparatus of an AC motor a first subtracter 1 for finding toque component voltage saturation amount $\Delta V_q$ from torque component voltage component $V_q'$ output from a torque component current controller 47a and torque component voltage command $V_q^*$ output from a torque component voltage limiter 54a, a first integrator 2 for holding the torque component voltage saturation amount $\Delta V_q$, a magnetic flux command corrector 3a for outputting magnetic flux command correction amount $\Delta \phi_{2d}$ from the held torque component voltage saturation amount $\Delta V_q'$ and rotation angular speed $\omega$ to Cartesian two-axis coordinates, and a second subtracter 4 for subtracting the magnetic flux command correction amount $\Delta \phi_{2d}$ from magnetic flux command $\phi_{2d}^*$ and outputting magnetic flux correction command $\phi_{2d}^*{}_{cmd}$.

16 Claims, 20 Drawing Sheets

US 6,809,492 B2

SPEED CONTROL DEVICE FOR AC ELECTRIC MOTOR

TECHNICAL FIELD

This invention relates to a speed control apparatus of an AC motor and in particular to improvement in characteristic in a higher-speed area than rated speed.

BACKGROUND OF THE INVENTION

In current control of an AC motor, often vector control is performed wherein the current of the AC motor is disassembled into an excitation component (which will be hereinafter referred to as d axis) and a torque component (which will be hereinafter referred to as q axis), of components on rotating Cartesian two-axis coordinates (which will be hereinafter referred to as dq-axis coordinates) and the components are controlled separately. The case of an induction motor will be discussed below as a related art.

FIG. 16 is a drawing to show the configuration of a speed control apparatus of an induction motor in a related art. In the figure, numeral 31 denotes an induction motor, numeral 32 denotes a PWM inverter for supplying electric power to the induction motor 31 based on voltage command Vu*, Vv*, Vw* described later, numerals 33a, 33b, and 33c denote current detectors for detecting currents $i_u$, $i_v$, and $i_w$ of the induction motor 31, and numeral 34 denotes a speed detector for detecting rotation speed $\omega_r$ of the induction motor 31. Numeral 35 denotes a secondary magnetic flux calculator for calculating magnetic flux $\phi_{2d}$ based on d-axis current $i_{1d}$ described later, numeral 36 denotes a slip frequency calculator for calculating slip angular frequency $\omega_s$ based on q-axis current $i_{1q}$ described later and the magnetic flux $\phi_{2d}$, numeral 37 denotes a coordinate rotation angular speed calculator for calculating rotation angular speed $\omega$ of dq-axis coordinates based on the slip angular frequency $\omega_s$ calculated by the slip frequency calculator 36 and the rotation speed $\omega_r$ of the induction motor 31 detected by the speed detector 34, and numeral 38 denotes an integrator for integrating the rotation angular speed $\omega$ and outputting phase angle θ of dq-axis coordinates. Numeral 39 denotes a three-phase to two-phase coordinate converter for disassembling the currents $i_u$, $i_v$, and $i_w$ of the current detectors 33a, 33b, and 33c into the d-axis current $i_{1d}$ and the q-axis current $i_{1q}$ on the dq-axis coordinates based on the phase angle θ of the dq-axis coordinates and outputting the d-axis current $i_{1d}$ and the q-axis current $i_{1q}$.

Numeral 40 denotes a subtracter for outputting magnetic flux deviation $e_f$ between magnetic flux command $\phi_{2d}*$ and the magnetic flux $\phi_{2d}$ output by the secondary magnetic flux calculator 35, numeral 41 denotes a magnetic flux controller for controlling proportional integration (which will be hereinafter referred to as PI) so that the magnetic flux deviation $e_f$ becomes 0 and outputting d-axis current component $i_{1d}'$, numeral 42 denotes a subtracter for outputting speed deviation $e_w$ between speed commands $\omega_r*$ and the rotation speed $\omega_r$ of the induction motor 31 output by the speed detector 34, and numeral 43 denotes a speed controller for controlling PI so that the speed deviation $e_w$ becomes 0 and outputting q-axis current component $i_{1q}'$.

Numeral 44 denotes a subtracter for outputting current deviation $e_{1d}$ between d-axis current command $i_{1d}*$ and d-axis current $i_{1d}$, numeral 45b denotes a d-axis current controller for controlling PI so that the current deviation $e_{1d}$ becomes 0 and outputting d-axis voltage component $V_d'$, numeral 46 denotes a subtracter for outputting current deviation $e_{1q}$ between q-axis current command $i_{1q}*$ and q-axis current $i_{1q}$, numeral 47b denotes a q-axis current controller for controlling PI so that the current deviation $e_{1q}$ becomes 0 and outputting q-axis voltage component $V_q'$, and numeral 48 denotes a two-phase to three-phase coordinate converter for converting d-axis voltage command $V_d*$ and q-axis voltage command $V_q*$ into the voltage commands Vu*, Vv*, and Vw* on the three-phase AC coordinates based on the phase angle θ of the dq-axis coordinates and outputting the voltage commands as voltage commands of the PWM inverter 32.

Numeral 51 denotes a d-axis current limiter for limiting the d-axis current component $i_{1d}'$ within a predetermined range and outputting the d-axis current command $i_{1d}*$, and numeral 52 denotes a q-axis current limiter for limiting the q-axis current component $i_{1q}'$ within a predetermined range and outputting the q-axis current command $i_{1q}*$. Numeral 53b denotes a d-axis voltage limiter for limiting the d-axis voltage component $V_d'$ within a predetermined range and outputting the d-axis voltage command $V_d*$, and numeral 54b denotes a q-axis voltage limiter for limiting the q-axis voltage component $V_q'$ within a predetermined range and outputting the q-axis voltage command Vq*.

Numeral 55 denotes a magnetic flux command generation section for arbitrarily giving the magnetic flux command $\phi_{2d}*$ of the induction motor. The speed command $\omega_r*$ is given arbitrarily from the outside.

FIG. 17 is a drawing to show the configuration of the PI controller of the magnetic flux controller 41, the speed controller 43, the d-axis current controller 45b, the q-axis current controller 47b, etc., in FIG. 16. In FIG. 17, numeral 61 denotes a coefficient unit corresponding to proportional gain $K_P$ of the PI controller, numeral 62 denotes a coefficient unit corresponding to integration gain $K_I$ of the PI controller, numeral 63b denotes an integrator having a function of stopping calculation, and numeral 64 denotes an adder for adding the proportional component and the integration component.

Letter e denotes deviation input to the PI controller and U' denotes control input output from the PI controller. As for the magnetic flux controller 41, e corresponds to the magnetic flux deviation $e_f$ between the magnetic flux command $\phi_{d2}*$ and the magnetic flux $\phi_{2d}$ output by the secondary magnetic flux calculator 35, and U' corresponds to the d-axis current component $i_{1d}'$. As for the speed controller 43, a corresponds to the speed deviation $e_w$ between the speed command $\omega_r*$ and the rotation speed $\omega_r$ of the induction motor 31 output by the speed detector 34, and U' corresponds to the q-axis current component $i_{1q}'$. As for the d-axis current controller 45b, e corresponds to the current deviation $e_{id}$ between the d-axis current command $i_{1d}*$ and the d-axis current $i_{1d}$, and U' corresponds to the d-axis voltage component $V_d'$. As for the q-axis current controller 47b, e corresponds to the current deviation $e_{iq}$ between the q-axis current command $i_{1q}*$ and the q-axis current $i_{1q}$, and U' corresponds to the q-axis voltage component $V_q'$.

The basic operation of the vector control in the induction motor will be discussed with FIGS. 16 and 17.

As shown in FIG. 16, the vector control is implemented using a plurality of PI controllers of the magnetic flux controller 41, the speed controller 43, the d-axis current controller 45b, the q-axis current controller 47b, etc., in combination.

The subtracter at the stage preceding each PI controller (subtracter 40, subtracter 42, subtracter 44, subtracter 46) outputs deviation e ($e_f$, $e_w$, $e_{id}$, $e_{iq}$) from the command value and actually detected value.

The PI controller is a controller for setting the deviation output from the subtracter at the predetermined stage to 0 (matching the command value and actually detected value with each other). Each PI controller inputs the deviation e output from the subtracter at the preceding stage and outputs such control input U' ($i_{1d}'$, $i_{1q}'$, $V_d'$, $V_q'$) setting the deviation e to 0 based on the following expression (1):

$$U' = (K_P + (K_I/s))_3 \cdot e \quad (1)$$

The block diagram of expression (1) is shown in FIG. 17, wherein $K_P$ denotes the proportional gain of the PI controller and $K_I$ denotes the integration gain of the PI controller. The PI controller used in FIG. 16 (magnetic flux controller 41, speed controller 43, d-axis current controller 45b, q-axis current controller 47b) is the PI controller shown in FIG. 17, but the PI controllers differ in values of $K_P$ and $K_I$.

In the magnetic flux controller 41 or the speed controller 43, the d-axis current component $i_{1d}'$ or the q-axis current component $i_{1q}'$ corresponds to the control input U', but cannot be set to a value equal to or greater than maximum output current value $i_{max}$ allowed by the PWM inverter 32. Then, the d-axis current limiter 51, the q-axis current limiter 52 limits so that the control input U' output from the magnetic flux controller 41, the speed controller 43 (d-axis current component $i_{1d}'$, q-axis current component, $i_{1q}'$) does not exceed the maximum output current value $i_{max}$ allowed by the PWM inverter 32.

In the d-axis current controller 45b or the q-axis current controller 47b, the d-axis voltage component $V_d'$ or the q-axis voltage component $V_q'$ corresponds to the control input U', but cannot be set to a value equal to or greater than bus voltage $V_{DC}$ of the PWM inverter 32. Thus, the d-axis voltage limiter 53b, the q-axis voltage limiter 54b limits so that the control input U' output from the d-axis current controller 45b or the q-axis current controller 47b (d-axis voltage component $V_d'$ or q-axis voltage component $V_q'$) does not exceed the bus voltage $V_{DC}$ of the PWM inverter 32.

However, the limit values of the d-axis current limiter 51, the q-axis current limiter 52, the d-axis voltage limiter 53b, and the q-axis voltage limiter 54b need not necessarily be the same.

As described above, in the speed control apparatus of the induction motor in the related art, the limiters 51, 52, 53b, and 54b are provided for outputs of the PI controllers 41, 43, 45b, and 47b and if the control input U' is limited by the limiter 51, 52, 53b, 54b, input deviation e does not become 0 for ever and if the deviation e continues to be accumulated in the integrator 63b in the PI controller, a phenomenon called control input saturation arises, causing a vibratory output response called overshoot or hunting; this is a problem.

Thus, if the control input U' exceeds the limit value of the limiter 51, 52, 53b, 54b, empirically the integration operation of the integrator 63b in the PI controller is stopped, thereby avoiding continuing to accumulator the deviation e for eliminating control input saturation, thereby obtaining a stable response.

FIG. 18 is a graph plotting the d-axis voltage component $V_d'$ and the q-axis voltage component $V_q'$ based on expressions for finding terminal-to-terminal voltage in a stationary state in the induction motor described later: In the figure, (a), (c), and (e) indicate the d-axis voltage component $V_d'$ and (b), (d), and (f) indicate the q-axis voltage component $V_q'$.

FIG. 19 is a graph to show the limit values of the q-axis current limiter relative to the rotation speed $\omega_r$.

FIG. 20 is a graph to show the maximum allowable values of the magnetic flux command $\phi_{2d}^*$ that can be arbitrarily output from the magnetic flux command generation section relative to the rotation speed $\omega_r$.

FIG. 18 corresponds to FIGS. 19 and 20. If the limit value is changed to (a), (c), and (e) in FIG. 19, the graph of FIG. 18 becomes as (a), (c), and (e). If the maximum allowable value is changed to (b), (d), and (f) in FIG. 20, the graph of FIG. 18 becomes as (b), (d), and (f).

To operate the induction motor at rated speed or more, the d-axis voltage component $V_d'$ and the q-axis voltage component $V_q'$ output from the d-axis current controller 45b and the q-axis current controller 47b continue to exceed the limit values of the d-axis voltage limiter 53b and the q-axis voltage limiter 54b stationarily. The above-described method of stopping the integration operation if the control input exceeds the limit value is means for temporarily avoiding the uncontrollable state of control input saturation and is effective for transient control input saturation, but cannot be used if control input saturation continues to occur stationarily as whether the induction motor is operated at the rated speed or more.

A method in related art for eliminating control input saturation of the voltage components $V_d'$ and $V_q'$ occurring stationarily at the rate speed or more will be discussed with FIGS. 18 to 20. Such control input saturation of $V_d'$ and $V_q'$ in high-speed area is particularly called voltage saturation.

As for the induction motor, the d-axis voltage component $V_d'$ and the q-axis voltage component $V_q'$ in a stationary state are given according to the following expressions (2) and (3):

$$V_d' = R_1 \cdot i_{1d} - L_1 \cdot \sigma \cdot \omega \cdot i_{1q} \quad (2)$$

$$V_q' = R_1 \cdot i_{1q} + (L_1/M) \cdot \omega \cdot \phi_{2d} \quad (3)$$

where $R_1$ denotes primary resistance of the induction motor 31, $L_1$ denotes primary side self inductance, M denotes mutual inductance, and σ denotes a leakage coefficient.

To operate the induction motor at the rated speed or more, the second term component in expression (2), (3) becomes very larger than the first term component and thus expression (2) and (3) can be approximated by the following expressions (4) and (5):

$$V_d' = -L_1 \cdot \sigma \cdot \omega \cdot i_{1q} \quad (4)$$

$$V_q' = (L_1/M) \cdot \omega \cdot \phi_{2d} \quad (5)$$

The q-axis current limiter 52 is a fixed limiter and the q-axis current limiter value is indicated by FIG. 19 (a). Here, assuming that the q-axis current $i_{1q}$ flows as much as the limit value, $V_d'$ becomes the graph of FIG. 18 (a) according to expression (4). The maximum allowable value of $\phi_{2d}^*$ that can be arbitrarily output from the magnetic flux command generation section 55 is indicated by FIG. 20 (b). Here, assuming that the magnetic flux $\phi_{2d}$ takes the same value as the maximum allowable value, $V_q'$ becomes the graph of FIG. 18 (b) according to expression (5).

From FIGS. 18 (a) and (b), it is seen that to operate the induction motor at rotation speed $\omega_{base}$ or more, the voltage component $V_q'$ becomes saturated exceeding the output limit value of the PWM inverter 32 $\pm V_{max}$ and that to operate the induction motor at rotation speed $\omega_{base2}$ or more, both the voltage components $V_d'$ and $V_q'$ become saturated exceeding the output limit value of the PWM inverter 32 $\pm V_{max}$.

Since voltage saturation occurs stationarily in such an area at the rated speed or more, the maximum allowable value of $\phi_{2d}^*$ of the magnetic flux command generation section 55 and the limit value of the q-axis current limiter 52 are changed in response to the speed. For example, if a variable limiter is adopted for changing the limit value of the q-axis current limiter in a manner inversely proportional to the speed from the rotation speed $\omega_{base2}$ at which saturation of the d-axis component occurs as indicated by FIG. 19 (c), even if the q-axis current $i_{1q}$ flows as much as the limit value, $V_d'$ becomes the graph of FIG. 18 (c) according to expression (4). If the maximum allowable value of $\phi_{2d}^*$ that can be arbitrarily output from the magnetic flux command generation section 55 is limited by a function inversely proportional to the speed from the rotation speed $\omega_{base}$ at which voltage saturation of the q-axis component occurs as indicated by FIG. 20 (d), even if the magnetic flux $\phi_{2d}$ takes the same value as the maximum allowable value, $V_q'$ becomes the graph of FIG. 18 (d) according to expression (5).

As described above, the limit value of the q-axis current limiter and the maximum allowable value of $\phi_{2d}^*$ are changed in response to the speed, whereby the d-axis voltage component $V_d'$ and the q-axis voltage component $V_q'$ are prevented from exceeding the output limit value of the PWM inverter 32 $\pm V_{max}$ even in an area at the rated speed or more, and occurrence of voltage saturation can be suppressed, so that a stable response can be provided.

However, if the induction motor is actually turned, the voltage component $V_d'$, $V_q'$ may become larger than FIG. 18 (c), (d) because of fluctuation of the magnitude of load or bus voltage, and voltage saturation occurs, resulting in an unstable response.

Then, the limit value of the q-axis current limiter and the maximum allowable value of $\phi_{d2}^*$ are set further lower as in FIG. 19 (e) and FIG. 20 (f) and the voltage component $V_d'$, $V_q'$ can be provided with a margin relative to the output limit value of the RWM inverter 32 $\pm V_{max}$ as in FIGS. 18 (e), (f) for making voltage saturation hard to occur.

In this case, however, it is made impossible to make full use of the capabilities of the PWM inverter and lowering of output torque or the like is incurred; this is a problem.

To make voltage saturation hard to occur without lowering the output torque, a method of feeding back a magnetic flux command or a current command for correction if voltage saturation occurs is proposed. In this method, when voltage saturation occurs, the saturation amount is detected, an optimum correction amount to eliminate the voltage saturation is formed from the saturation amount, and each command is corrected. Such feedback control is performed, whereby occurrence of voltage saturation can be suppressed and stability of control can be improved independently of the conditions of the load and the bus voltage, and it is also made possible to make full use of the capabilities of the PWM inverter.

For example, the Unexamined Japanese Patent Application No. 2000-92899 discloses a control apparatus of an induction motor, comprising a voltage saturation compensation circuit for making a comparison between a voltage command value from a current control system and a bus voltage value of a PWM inverter and integrating and if the above-mentioned bus voltage value is greater than the above-mentioned voltage command value, the voltage saturation compensation circuit for subtracting the above-mentioned integrated output from a magnetic flux command and if the above-mentioned bus voltage value is lower than the above-mentioned voltage command value, for subtracting 0 from the magnetic flux command.

In this method, the correction amount is derived in response to the voltage saturation amount and each command is corrected, so that voltage saturation can be eliminated; however, since the speed of the motor is not considered when the correction amount is determined, to cope with rapid speed change, etc., calculation of the correction amount, etc., must be thought out in such a manner that the correction amount is increased to make a prompt correction at the acceleration time and that the correction amount is suppressed to raise stability at the deceleration time, for example; the method involves such a problem.

The invention is intended for solving the problems as described above and it is an object of the invention to provide a speed control apparatus of an AC motor for making it possible to suppress occurrence of voltage saturation without performing special operation even if rapid speed change, etc., occurs.

DISCLOSURE OF THE INVENTION

According to the invention, there is provided a speed control apparatus of an AC motor having current controllers for performing proportional integration control of an excitation component current and a torque component current of two components on rotating Cartesian two-axis coordinates into which a current of the AC motor is separated, the speed control apparatus comprising:

a torque component voltage limiter for limiting a torque component voltage component output from torque component current controller for performing proportional integration control of the torque component current so that the torque component voltage component becomes equal to or less than a predetermined value; a first subtracter for finding a torque component voltage saturation amount from the torque component voltage component output from the above-mentioned torque component current controller and a torque component voltage command output from the above-mentioned torque component voltage limiter; a first integrator for holding the torque component voltage saturation amount; a magnetic flux command corrector for outputting a magnetic flux command correction amount from the held torque component voltage saturation amount and rotation angular speed of Cartesian two-axis coordinates; and a second subtracter for subtracting the magnetic flux command correction amount from a magnetic flux command and outputting a magnetic flux correction command, so that if the speed rapidly changes, etc., the optimum correction amount can always be obtained and occurrence of voltage saturation can be suppressed.

Also, there is provided a speed control apparatus of an AC motor having current controllers for performing proportional integration control of an excitation component current and a torque component current of two components on rotating Cartesian two-axis coordinates into which a current of the AC motor is separated, the speed control apparatus comprising:

a torque component voltage limiter for limiting a torque component voltage component output from torque component current controller for performing proportional integration control of the torque component current so that the torque component voltage component becomes equal to or less than a predetermined value; a first subtracter for finding a torque component voltage saturation amount from the torque component voltage component output from the above-mentioned torque component current controller and a torque component voltage command output from the above-mentioned torque component voltage limiter; a first integrator for holding the torque component voltage saturation amount; an excitation component current command corrector for outputting an excitation component current command correction amount from the held torque component voltage saturation amount and rotation angular speed of Cartesian two-axis coordinates; and a third subtracter for subtracting the excitation component current command correction amount from an excitation component current command and outputting an excitation component current command correction command, so that if the speed rapidly changes, etc., the optimum correction amount can always be obtained and it is possible to suppress occurrence of voltage saturation.

Rotation speed of the above-mentioned AC motor is input to a magnetic flux command generation section for generating a magnetic flux command and a magnetic flux command is generated in response to the rotation speed of the above-mentioned AC motor, so that the magnitude of the torque component voltage saturation amount can be lessened to some extent and it is made possible to improve the stability of control of the AC motor.

Rotation speed of the above-mentioned AC motor is input to an excitation component current command generation section for generating an excitation component current command and an excitation component current command is generated in response to the rotation speed of the above-mentioned AC motor, so that the magnitude of the torque component voltage saturation amount can be lessened to some extent and it is made possible to improve the stability of control of the AC motor.

The speed control apparatus comprises an excitation component voltage limiter for limiting an excitation component voltage component output from excitation component current controller for performing proportional integration control of the excitation component current so that the excitation component voltage component becomes equal to or less than a predetermined value; a fourth subtracter for finding the excitation component voltage component output from the above-mentioned excitation component current controller and an excitation component voltage saturation amount output from the above-mentioned excitation component voltage limiter; a second integrator for holding the excitation component voltage saturation amount; an excitation component current command corrector for outputting a torque component current command correction amount from the held excitation component voltage saturation amount and rotation angular speed of Cartesian two-axis coordinates; and a fifth subtracter for subtracting the torque component current command correction amount from a torque component current command and outputting a torque component current correction command, so that to operate the AC motor in an area wherein the speed largely exceeds the rated speed, occurrence of voltage saturation can also be suppressed and it is possible to perform stable control.

In a torque component current limiter for limiting a torque component current command output from a speed controller for performing proportional integration control of speed deviation between a speed command and the rotation speed of the AC motor so that the torque component current command becomes equal to or less than a predetermined value, the limit value for limiting the torque component current command is varied in response to the rotation speed of the above-mentioned AC motor, so that the magnitude of the extinction component voltage saturation amount can be lessened to some extent and it is made possible to improve the stability of control of the AC motor.

According to the invention, there is provided a speed control apparatus of an AC motor having current controllers for performing proportional integration control of an excitation component current and a torque component current of two components on rotating Cartesian two-axis coordinates into which a current of the AC motor is separated, wherein torque component current controller for performing proportional integration control of the torque component current is configured so as to continue calculation of an internal integrator even if torque component voltage component becomes saturated, the speed control apparatus comprising a torque component voltage limiter for limiting the torque component voltage component output from the torque component current controller for performing proportional integration control of the torque component current so that the torque component voltage component becomes equal to or less than a predetermined value; a first subtracter for finding a torque component voltage saturation amount from the torque component voltage component output from the above-mentioned torque component current controller and a torque component voltage command output from the above-mentioned torque component voltage limiter; a magnetic flux command corrector for outputting a magnetic flux command correction amount from the torque component voltage saturation amount and rotation angular speed of Cartesian two-axis coordinates; and a second subtracter for subtracting the magnetic flux command correction amount from a magnetic flux command and outputting a magnetic flux correction command, so that occurrence of voltage saturation can be suppressed according to the sample configuration.

Also, there is provided a speed control apparatus of an AC motor having current controllers for performing proportional integration control of an excitation component current and a torque component current of two components on rotating Cartesian two-axis coordinates into which a current of the AC motor is separated, wherein torque component current controller for performing proportional integration control of the torque component current is configured so as to continue calculation of an internal integrator even if torque component voltage component becomes saturated, the speed control apparatus comprising a torque component voltage limiter for limiting a torque component voltage component output from torque component current controller for performing proportional integration control of the torque component current so that the torque component voltage component becomes equal to or less than a predetermined value; a first subtracter for finding a torque component voltage saturation amount from the torque component voltage component output from the above-mentioned torque component current controller and a torque component voltage command output from the above-mentioned torque component voltage limiter; an excitation component current command corrector for outputting an excitation component current command correction amount from the torque component voltage saturation amount and rotation angular speed of Cartesian two-axis coordinates; and a third subtracter for subtracting the excitation component current command correction amount from an excitation component current command and outputting an excitation component current command correction command, so that occurrence of voltage saturation can be suppressed according to the simple configuration.

Rotation speed of the above-mentioned AC motor is input to a magnetic flux command generation section for generating a magnetic flux command and a magnetic flux command is generated in response to the rotation speed of the above-mentioned AC motor, so that the magnitude of the torque component voltage saturation amount can be lessened to some extent and it is made possible to improve the stability of control of the AC motor according to the simple configuration.

Rotation speed of the above-mentioned AC motor is input to an excitation component current command generation section for generating an excitation component current command and an excitation component current command is generated in response to the rotation speed of the above-mentioned AC motor, so that the magnitude of the torque component voltage saturation amount can be lessened to some extent and it is made possible to improve the stability of control of the AC motor according to the simple configuration.

Excitation component current controller for performing proportional integration control of the excitation component current is configured so as to continue calculation of an internal integrator even if excitation component voltage component becomes saturated, and the speed control apparatus comprises an excitation component voltage limiter for limiting the excitation component voltage component output from the excitation component current controller for performing proportional integration control of the excitation component current so that the excitation component voltage component becomes equal to or less than a predetermined value; a fourth subtracter for finding the excitation component voltage component output from the above-mentioned excitation component current controller and an excitation component voltage saturation amount output from the above-mentioned excitation component voltage limiter; an excitation component current command corrector for outputting a torque component current command correction amount from the excitation component voltage saturation amount and rotation angular speed of Cartesian two-axis coordinates; and a fifth subtracter for subtracting the torque component current command correction amount from a torque component current command and outputting a torque component current correction command, so that to operate the AC motor in an area wherein the speed largely exceeds the rated speed, occurrence of voltage saturation can also be suppressed and it is possible to perform stable control according to the simple configuration.

In a torque component current limiter for limiting a torque component current command output from a speed controller for performing proportional integration control of speed deviation between a speed command and the rotation speed of the AC motor so that the torque component current command becomes equal to or less than a predetermined value, the limit value for limiting the torque component current command is varied in response to the rotation speed of the above-mentioned AC motor, so that the magnitude of the excitation component voltage saturation amount can be lessened to some extent and it is made possible to improve the stability of control of the AC motor according to the simple configuration.

BEST MODE FOR CARRYING OUT THE INVENTION

First Embodiment

Figure 1:
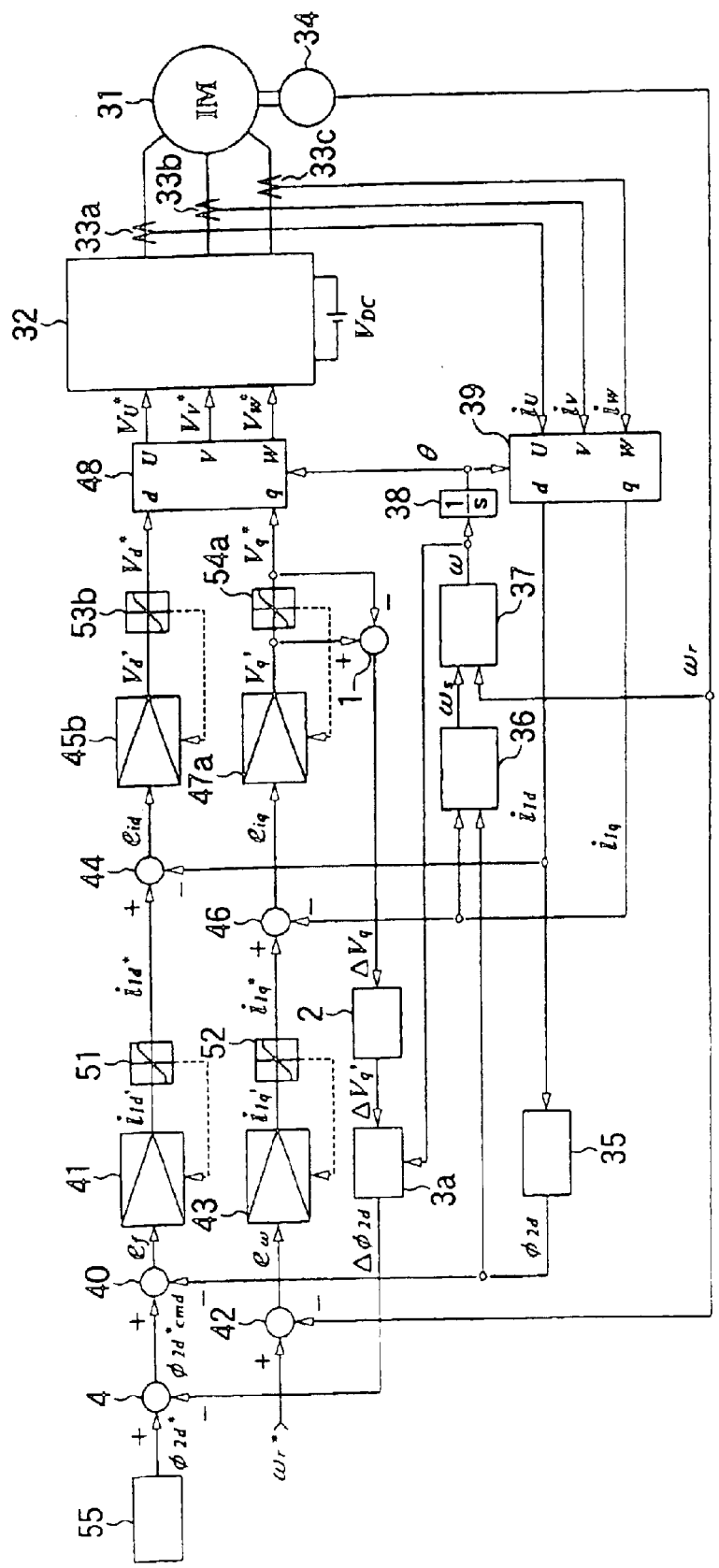
FIG. 1 is a drawing to show the configuration of a speed control apparatus of an induction motor according to a first embodiment of the invention.
Figure 16:
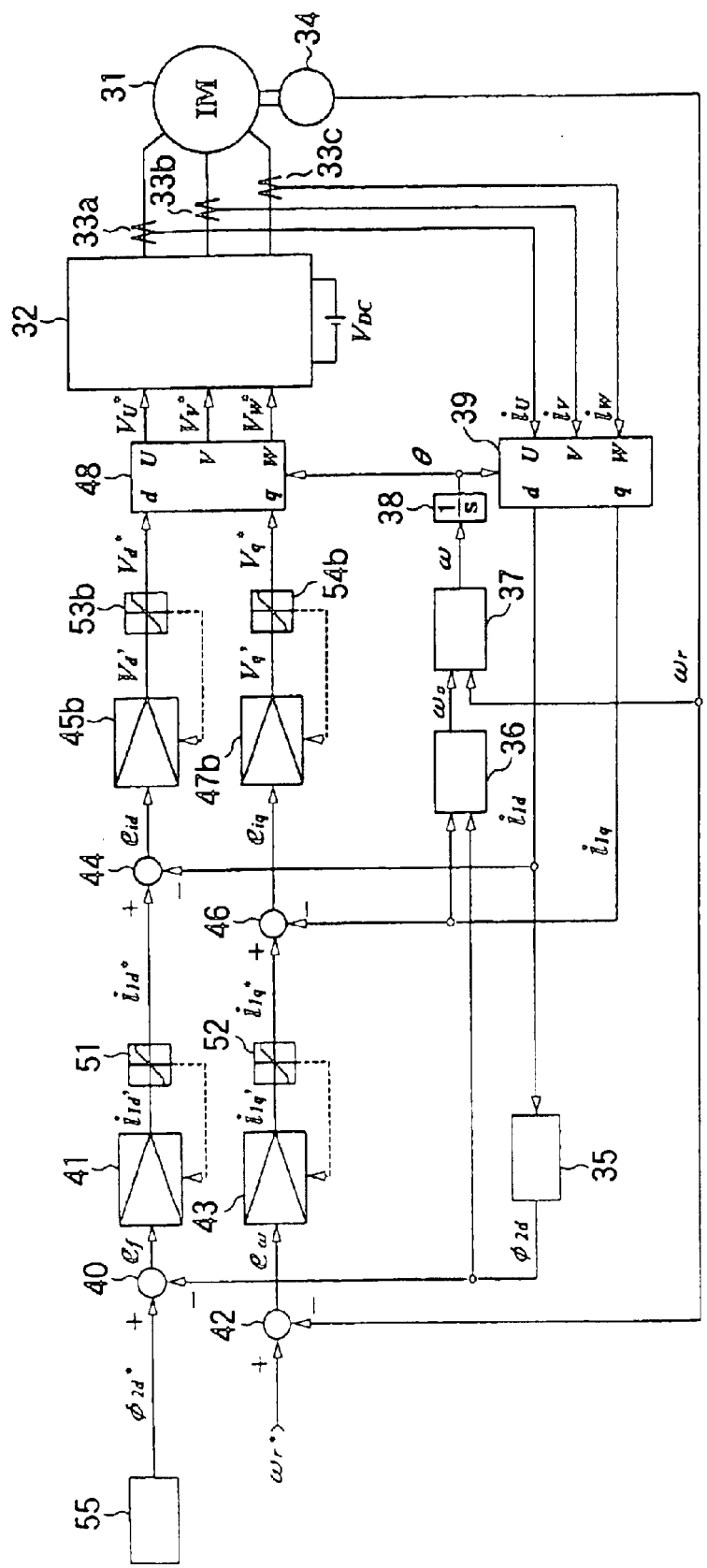
FIG. 16 is a drawing to show the configuration of a speed control apparatus of an inductor motor in a related art.

FIG. 1 is a drawing to show the configuration of a speed control apparatus of an induction motor according to a first embodiment of the invention. In the figure, numerals 31 to 39, 40 to 44; 45b, 46, 48, 51, 52, 53b, and 55 are similar to those in FIG. 16 and will not be discussed again. Numeral 1 denotes a first subtracter for outputting q-axis voltage saturation amount $\Delta V_q$ from q-axis voltage component $V_q^1$ and q-axis voltage command $V_q*$, numeral 2 denotes a first integrator for holding the q-axis voltage saturation amount $\Delta V_q^1$, numeral 3a denotes a magnetic flux command corrector for outputting magnetic flux command correction amount $\Delta\Phi_{2d}$ from the held q-axis voltage saturation amount $\Delta V_q^1$, and rotation angular speed $\omega$ of dq-axis coordinates, and numeral 4 denotes a second subtracter for outputting magnetic flux correction command $\Phi_{2d}{}^*_{cmd}$ resulting from subtracting the magnetic flux command correction amount $\Delta\Phi_{2d}$ from magnetic flux command $\Phi_{2d}{}^*$.

Numeral 47a denotes a q-axis current controller for controlling PI so that current deviation $e_{iq}$ becomes 0 and outputting the q-axis voltage component $V_q'$, and numeral 54a denotes a q-axis voltage limiter for limiting the q-axis voltage component $V_q'$ within a predetermined range and outputting the q-axis voltage command $V_q{}^*$.

Figure 2:
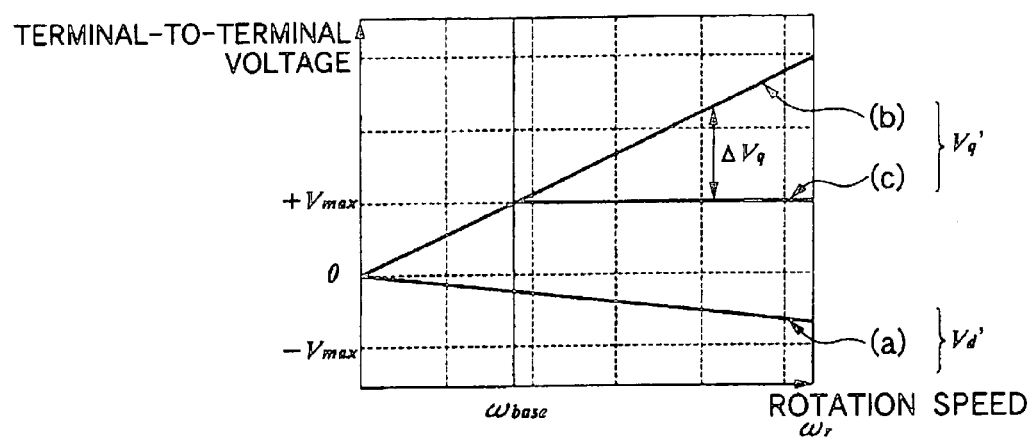
FIG. 2 is a graph plotting d-axis voltage component $V_d'$ and q-axis voltage component $V_q'$ based on expressions (4) and (5) for finding terminal-to-terminal voltage in a stationary state in the induction motor described above.

FIG. 2 is a graph plotting d-axis voltage component $V_d'$ and the q-axis voltage component $V_q'$ based on expressions (4) and (5) for finding terminal-to-terminal voltage in a stationary state in the induction motor described above; (a) indicates a graph of d-axis voltage command $V_d{}^*$ before being corrected according to the first embodiment, (b) indicates a graph of q-axis voltage command $V_q{}^*$ before being corrected according to the first embodiment, and (c) indicates a graph of q-axis voltage command $V_q{}^*$ after being corrected according to the first embodiment.

Figure 3:
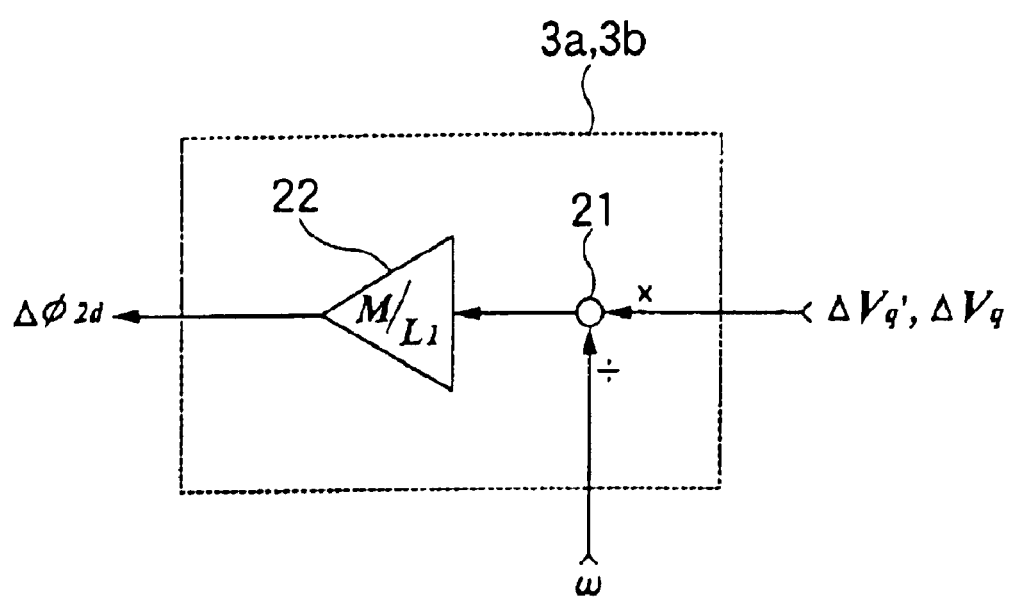
FIG. 3 is a drawing to show the configuration of a magnetic flux command corrector 3a, 3b in the speed control apparatus of the induction motor according to the first embodiment of the invention.

FIG. 3 is a drawing to show the configuration of the magnetic flux command corrector 3a in the speed control apparatus of the induction motor according to the first embodiment of the invention. In the figure, numeral 21 denotes a divider for dividing the held q-axis voltage saturation amount $\Delta V_q'$ by the rotation angular speed $\omega$ of dq-axis coordinates, and numeral 22 denotes a coefficient unit for inputting output of the divider 21 and outputting the magnetic flux command correction amount $\Delta\phi_{2d}$. However, in a magnetic flux command corrector 3b described later, divider 21 divides the q-axis voltage saturation amount $\Delta V_q$ by the rotation angular speed $\omega$ of dq-axis coordinates.

The operation of the speed control apparatus of the induction motor according to the first embodiment will be discussed with FIGS. 1 to 3, FIG. 19, and FIG. 20. When voltage saturation does not occur, the speed control apparatus operates in a similar manner to that in the related art and the operation of the speed control apparatus will not be discussed again.

The terminal-to-terminal voltage of the induction motor in a stationary state is given according to expressions (4) and (5), as described above in the related art example.

Figure 19:
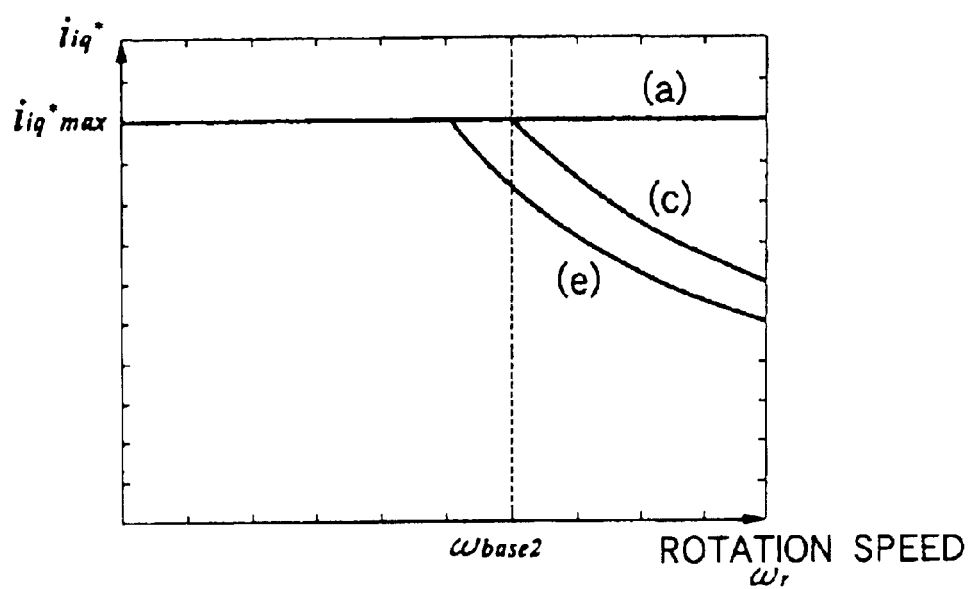
FIG. 19 is a graph to show the limit values of the q-axis current limiter relative to rotation speed $\omega_r$.
Figure 20:
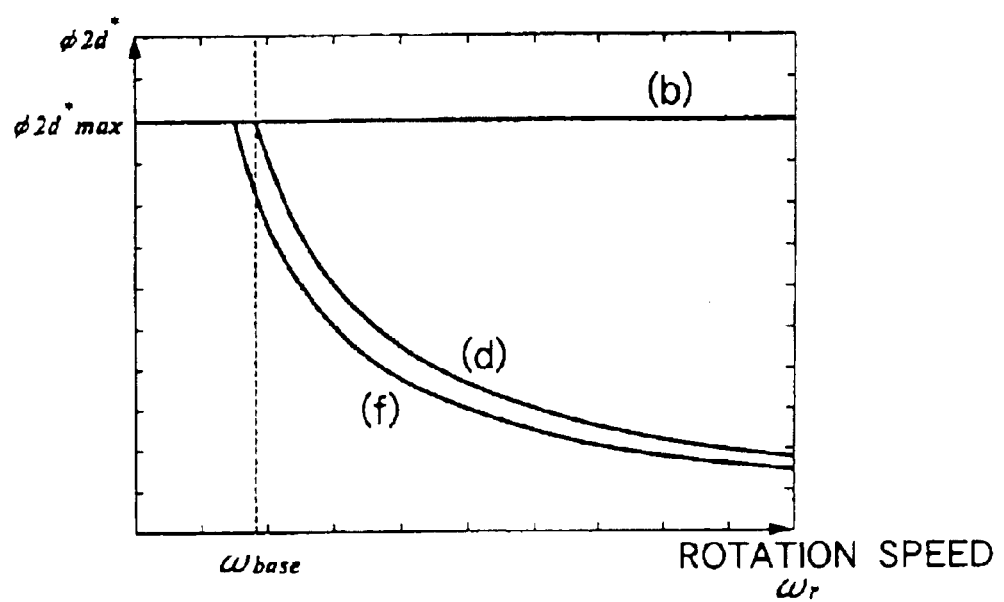
FIG. 20 is a graph to show the maximum allowable values of magnetic flux command $\phi_{2d}*$ that can be arbitrarily output from a magnetic flux command generation section relative to the rotation speed $\omega_r$.

A q-axis current limiter 52 is a fixed limiter with a limit value indicated by FIG. 19 (a). Assuming that a q-axis current $i_{1q}$ flows as much as the limit value, $V_d'$ becomes the graph of FIG. 2 (a) according to expression (4). The maximum allowable value of $\phi_{2d}{}^*$ that can be arbitrarily output from a magnetic flux command generation section 55 is indicated by FIG. 20 (b). Assuming that magnetic flux 100$_{2d}$ takes the same value as the maximum allowable value, $V_q'$ becomes the graph of FIG. 2 (b) according to expression (5).

To operate the induction motor in an area wherein the speed is about twice the rated speed (rotation speed $\omega_{base}$), the d-axis voltage component $V_d'$ does not exceed output limit value $\pm V_{max}$ as indicated by FIG. 2 (a). However, to operate the induction motor in an area wherein the speed is equal to or higher than the rotation speed $\omega_{base}$, the q-axis voltage component $V_q'$ exceeds output limit value $\pm V_{max}$ and voltage saturation occurs. If voltage saturation occurs, the q-axis voltage component $V_q'$ is limited to $\pm V_{max}$ by the q-axis voltage limiter 54a. The input/output value of the q-axis voltage limiter 54a is passed through the subtracter 1, whereby deviation (which will be hereinafter referred to as q-axis voltage saturation amount $\Delta V_q$) can be found. The q-axis voltage saturation amount $\Delta V_q$ is a parameter indicating how much voltage is saturated, and corresponds to the $V_q'$ difference indicated by FIGS. 2 (b) and (c).

In expression (5), $L_1$ and $M$ are parameters of induction motor and are fixed and the speed $\omega$ needs to be made as commanded because of the speed control apparatus and cannot be corrected. Thus, it is seen that when voltage saturation occurs due to the q-axis voltage component $V_q'$, the magnetic flux $\phi_{2d}$ must be corrected to a lower value to suppress $V_q'$. That is, the correction amount $\Delta\phi_{2d}$ to the magnetic flux is found from the held q-axis voltage saturation amount $\Delta V_q'$ and the magnetic flux is corrected to a lower value based on the correction amount, whereby voltage saturation is eliminated.

The relationship between the held q-axis voltage saturation amount $\Delta V_q'$ and the magnetic flux command correction amount $\Delta\phi_{2d}$ to eliminate voltage saturation is represented by expression (6) similar to expression (5).

$$\Delta V_q' = (L_1/M)\cdot\omega\cdot\Delta\phi_{2d} \tag{6}$$

Further, if expression (6) is deformed with respect to the magnetic flux command correction amount $\Delta\phi_{2d}$, it results in expression (7).

$$\Delta\phi_{2d} = (M/L_1)\cdot\Delta V_q'/\omega \tag{7}$$

Expression (7) becomes an expression for finding the correction amount $\Delta\phi_{2d}$ to the magnetic flux from the held q-axis voltage saturation amount $\Delta V_d'$ and corresponds to the magnetic flux command corrector 3a in FIG. 1 and a specific block diagram thereof is shown in FIG. 3.

The magnetic flux command correction amount $\Delta\phi_{2d}$ obtained as mentioned above is input to the subtracter 4 and the magnetic flux command $\phi_{2d}{}^*$ is corrected to a lower value of the magnetic flux correction command $\phi_{2d}{}^*_{cmd}$. According to the correction, the graph of the q-axis voltage component $V_q'$ plotted based on the expression of the terminal-to-terminal voltage becomes FIG. 2 (c) and occurrence of voltage saturation of the q-axis component can be suppressed.

In the first embodiment, if q-axis voltage saturation occurs, the degree of the voltage saturation is detected as the q-axis voltage saturation amount, the optimum magnetic flux command correction amount for eliminating the voltage saturation is determined in response to the q-axis voltage saturation amount, and the magnetic flux command is corrected in a feedback manner.

When the correction amount is determined, the speed of the motor is considered. Thus, if the speed changes rapidly, etc., the optimum correction amount can always be obtained and it is possible to suppress occurrence of voltage saturation.

Stable control can be performed independently of change in the conditions of the load and the bus voltage, and the capabilities of the PWM inverter can always be exploited at the maximum, so that it is made possible to increase output torque, etc.

The example of the induction motor has been described as the AC motor, but similar means can be used not only for the induction motor, but also for a synchronous motor for which magnetic flux control can be performed, needless to say.

Second Embodiment

Figure 4:
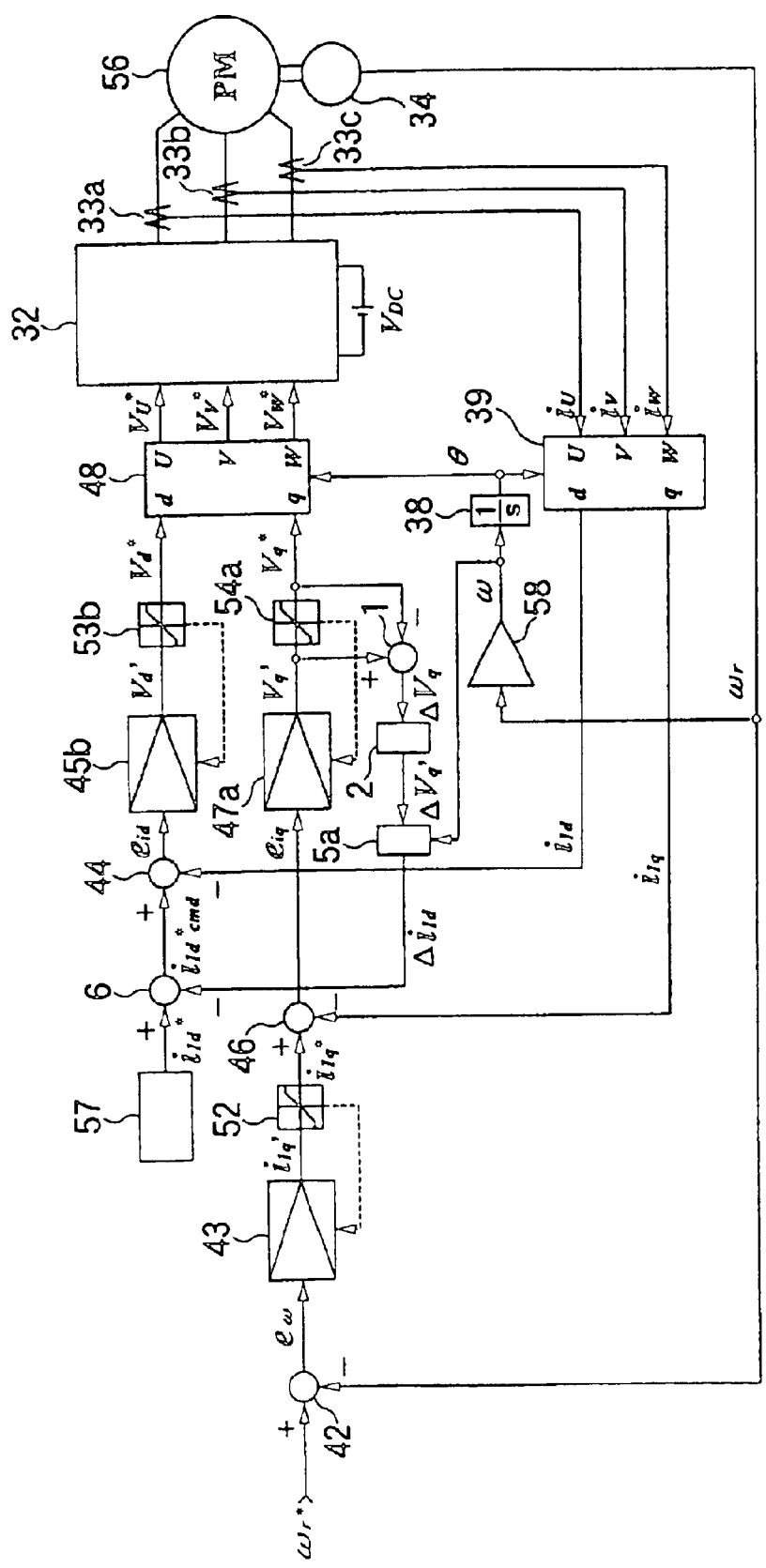
FIG. 4 is a drawing to show the configuration of a speed control apparatus of a permanent-magnet motor according to a second embodiment of the invention.

FIG. 4 is a drawing to show the configuration of a speed control apparatus of a permanent-magnet motor according to a second embodiment of the invention. In the figure, numerals 1, 2, 32 to 34, 38, 39, 42 to 44, 45b, 47a, 48, 52, 53b, and 54a are similar to those in FIG. 1 and will not be discussed again.

Numeral 5a denotes a d-axis current command corrector for inputting held q-axis voltage saturation amount $\Delta V_q'$ and rotation angular speed $\omega$ of dq-axis coordinates and outputting d-axis current command correction amount $\Delta i_{1d}$, and numeral 6 denotes a third subtracter for outputting d-axis current correction command $i_{1d}{}^*{}_{cmd}$ corrected by subtracting the d-axis current command correction amount $\Delta i_{1d}$ from d-axis current command $i_{1d}{}^*$. Numeral 56 denotes a permanent-magnet motor, numeral 57 denotes a d-axis current command generation section for outputting an arbitrary d-axis current command, and numeral 58 denotes a coefficient unit for calculating coordinate rotation angular speed.

In the first embodiment, the example of the speed control apparatus for controlling the induction motor has been shown; the second embodiment relates to the speed control apparatus for controlling a permanent-magnet motor as an AC motor.

In FIG. 4, as compared with FIG. 1 showing the configuration of the speed control apparatus for controlling the induction motor, as the AC motor to be controlled, the induction motor 31 is replaced with a permanent-magnet motor 56, the magnetic flux command generation section 55, the subtracter 4, the magnetic flux command corrector 3a, the secondary magnetic flux calculator 35, the slip frequency calculator 36, the coordinate rotation angular speed calculator 37, the subtracter 40, the magnetic flux controller 41, and the current limiter 51 are deleted, and the d-axis current command generation section 57 for outputting an arbitrary d-axis current command, the coefficient unit 58 for calculating coordinate rotation angular speed, and the subtracter 6 are newly added. The speed control apparatus for controlling the permanent-magnet motor differs from the speed control apparatus for controlling the induction motor slightly in basic configuration, but they perform the same basic operation and also involve the same problem to be solved.

Figure 5:
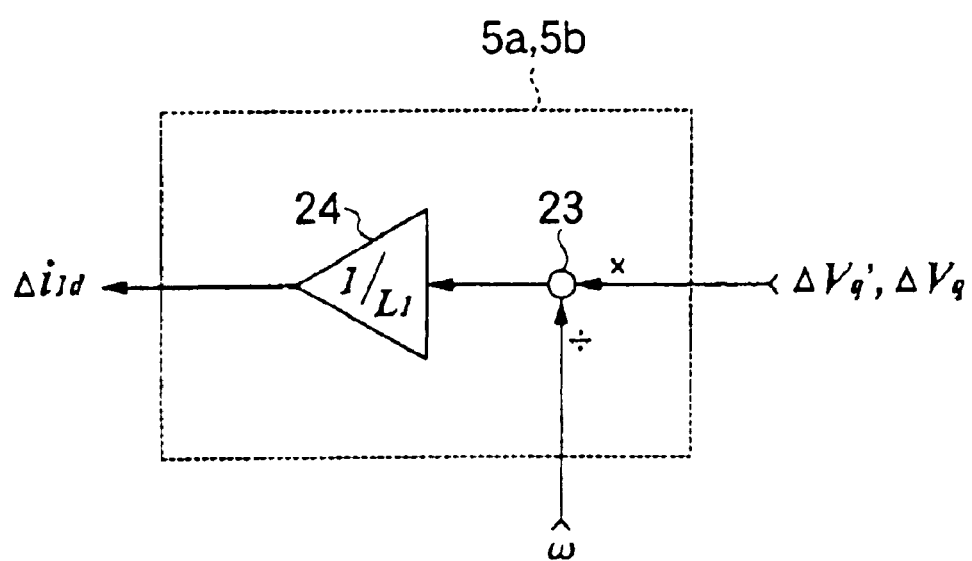
FIG. 5 is a drawing to show the configuration of a d-axis current command corrector 5a, 5b according to the second embodiment of the invention.

FIG. 5 is a drawing to show the configuration of the d-axis current command corrector 5a according to the second embodiment of the invention. In the figure, numeral 23 denotes a divider for dividing the held q-axis voltage saturation amount $\Delta V_q'$ by the rotation angular speed $\omega$ of dq-axis coordinates, and numeral 24 denotes a coefficient unit for inputting output of the divider 23 and outputting the d-axis current command correction amount $\Delta i_{1d}$. However, in a d-axis current command corrector 5b described later, divider 23 divides the q-axis voltage saturation amount $\Delta V_q$ by the rotation angular speed $\omega$ of dq-axis coordinates.

As for the permanent-magnet motor, the d-axis voltage component $V_d'$ and the q-axis voltage component $V_q'$ in a stationary state are given according to the following expressions (8) and (9):

$$V_d' = R_1 \cdot i_{1d} - L_q \cdot \omega \cdot i_{1q} \tag{8}$$

$$V_q' = R_1 \cdot i_{1q} + \omega(L_d \cdot i_{1d} + \phi_f) \tag{9}$$

where $R_1$ denotes primary resistance of the permanent-magnet motor 56, $L_d$ denotes d-axis component inductance, $L_q{}^*$ denotes q-axis component inductance, and $\phi_f$ denotes the maximum value of flux linkage produced by the permanent magnet.

To operate the permanent-magnet motor at the rated speed or more, each second term component becomes very larger than the first time component and thus expression (8) can be approximated by expression (10) and expression (9) can be approximated by expression (11):

$$V_d' = -L_q \cdot \omega \cdot i_{1q} \tag{10}$$

$$V_q' = \omega(L_d \cdot i_{1d} + \phi_f) \tag{11}$$

The operation of the speed control apparatus according to the second embodiment will be discussed with FIGS. 4 and 5. When voltage saturation does not occur, the speed control apparatus operates in a similar manner to that in the related art and the operation of the speed control apparatus will not be discussed again.

In the first embodiment, when voltage saturation occurs due to the q-axis voltage component $V_q'$, a correction is made to the magnetic flux command to eliminate the voltage saturation; in the second embodiment, the AC motor comprising no magnetic flux control system, the permanent-magnet motor, is to be controlled and thus the correction method is as follows:

If voltage saturation occurs, the q-axis voltage component $V_q'$ is limited to $\pm V_{max}$ by a q-axis voltage limiter 54a. The input/output value of the q-axis voltage limiter 54a is passed through a subtracter 1, whereby deviation (which will be hereinafter referred to as q-axis voltage saturation amount $\Delta V_q$) can be found. The q-axis voltage saturation amount $\Delta V_q$ is a parameter indicating how much voltage is saturated.

In expression (11), $L_d$ and $\phi_f$ are parameters of permanent-magnet motor and are fixed and the speed $\omega$ needs to be made as commanded because of the speed control apparatus and cannot be corrected. Thus, it is seen that when voltage saturation occurs due to the q-axis voltage component $V_q'$, d-axis current $i_{1d}$ must be corrected to a lower value to suppress $V_q'$. That is, the correction amount $\Delta i_{1d}$ to the d-axis current is found from the held q-axis voltage saturation amount $\Delta V_q'$ and the d-axis current is corrected to a lower value based on the correction amount, whereby voltage saturation is eliminated.

The relationship between the held q-axis voltage saturation amount $\Delta V_q'$ and the d-axis current command correction amount $\Delta i_{1d}$ to eliminate voltage saturation can be thought according to expression (12).

$$\Delta V_q' = \omega \cdot L_d \cdot \Delta i_{1d} \tag{12}$$

If expression (12) is deformed with respect to the d-axis current command correction amount $\Delta i_{1d}$, expression (13) is obtained.

$$\Delta i_{1d}' = \Delta V_q'/(\omega \cdot L_d) \tag{13}$$

Expression (13) becomes an expression for deriving the correction amount $\Delta i_{1d}$ to the d-axis current from the held q-axis voltage saturation amount $\Delta V_q'$ and corresponds to the d-axis current command corrector 5a in FIG. 4 and a specific block diagram thereof is shown in FIG. 5.

The d-axis current command correction amount $\Delta i_{1d}$ thus obtained is input to the subtracter 6 and d-axis current command $i_{id}{}^*$ is corrected to a lower value of the d-axis current correction command $i_{1d}{}^*{}_{cmd}$. According to the correction, occurrence of voltage saturation of the q-axis component can be suppressed.

As described above, according to the second embodiment, in the AC motor comprising no magnetic flux control system, occurrence of voltage saturation can also be suppressed if the speed rapidly changes as in the first embodiment, stable control can be performed independently of change in the conditions of load and bus voltage, and the capabilities of the PWM inverter can always be exploited at the maximum, so that it is made possible to increase output torque, etc.

Similar means can be used not only for the permanent-magnet motor, but also for the induction motor comprising no magnetic flux control system, needless to say. The permanent-magnet motors include an SPM motor having no silent-pole property wherein $L_d=L_q$ and an IPM motor having silent-pole property wherein $L_d<L_q$, but in the invention, the technique can be applied to any permanent-magnet motors regardless of the presence or absence of silent-pole property.

Third Embodiment

Figure 6:
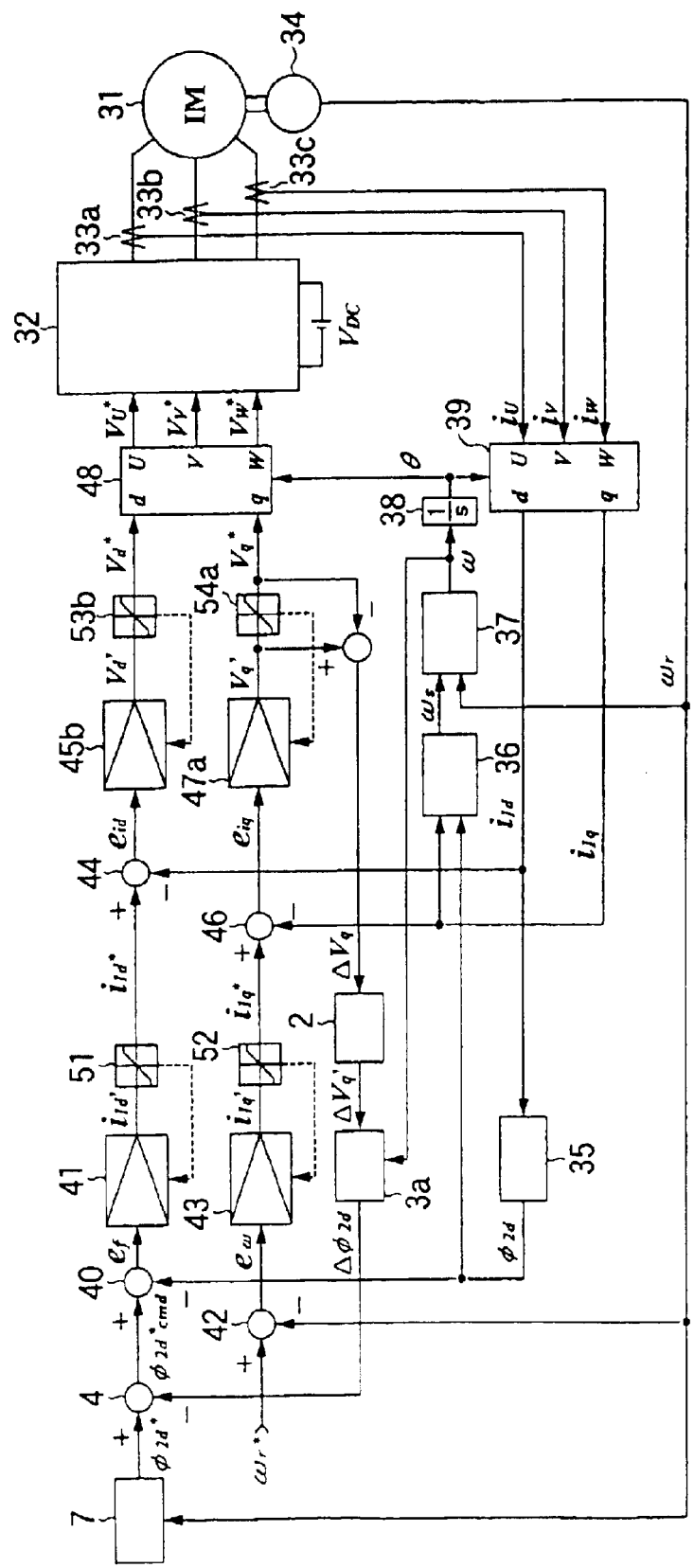
FIG. 6 is a drawing to show the configuration of a speed control apparatus of an induction motor according to a third embodiment of the invention.

FIG. 6 is a drawing to show the configuration of a speed control apparatus of an induction motor according to a fourth embodiment of the invention. In the figure, numerals 1, 2, 3a, 4, 31 to 39, 40 to 45, 45b, 46, 47a, 48, 51, 52, 53b, and 54a similar to those in FIG. 1 and will not be discussed again. Numeral 7 denotes a magnetic flux command generation section for inputting rotation speed $\omega_r$ of an induction motor 31 and outputting magnetic flux command $\phi_{2d}^*$ of the induction motor in response to the rotation speed $\omega_r$.

The operation of the speed control apparatus of an AC motor according to the third embodiment will be discussed with FIGS. 6 and 2.

In the first embodiment, the example is shown wherein if q-axis voltage saturation occurs, the magnetic flux command correction amount $\Delta\phi_{2d}$ found from the held q-axis voltage saturation amount $\Delta V_q'$ and the rotation angular speed $\omega$ of the dq-axis coordinates is subtracted from the magnetic flux command $\phi_{2d}^*$ output from the magnetic flux command generation section 55 to generate the magnetic flux correction command $\phi_{2d}^*{}_{cmd}$. To suppress occurrence of voltage saturation; the magnetic flux correction command $\phi_{2d}^*{}_{cmd}$ may be decreased in response to an increase in the rotation speed $\omega_r$.

The magnetic flux command generation section 55 generally outputs a constant value (magnetic flux command $\phi_{2d}^*$). Thus, when the rotation speed $\omega_r$ increases, unless the magnetic flux command correction amount $\Delta\phi_{2d}$ is increased, it becomes impossible to suppress occurrence of voltage saturation. As shown in FIG. 2, as the rotation speed $\omega_r$ increases, the q-axis voltage saturation amount $\Delta V_q$ grows. However, to perform stable control, it is not much preferred that the fed-back correction amount becomes too large.

In the third embodiment, the rotation speed $\omega_r$ is input to the magnetic flux command generation section 9 and the magnetic flux command $\phi_{2d}^*$ is varied in response to the rotation speed $\omega_r$. For example, the magnetic flux command $\phi_{2d}^*$ is varied in such a manner that the magnetic flux command $\phi_{2d}^*$ is weakened in inverse proportion to an increase in the rotation speed $\omega_r$.

The magnetic flux command $\phi_{2d}^*$ output from the magnetic flux command generation section 9 is changed in response to an increase in the rotation speed $\omega_r$, whereby the q-axis voltage saturation amount $\Delta V_q$ can be lessened and the magnetic flux command correction amount $\Delta\phi_{2d}$ fed back as the correction amount can be suppressed.

As described above, according to the third embodiment, the rotation speed $\omega_r$ is input to the magnetic flux command generation section 7 and the magnetic flux command $\phi_{2d}^*$ to be output is varied accordingly, so that the magnitude of the magnetic flux command correction amount $\Delta\phi_{2d}$ fed back can be lessened to some extent and it is made possible to improve the stability of control of the AC motor.

Figure 7:
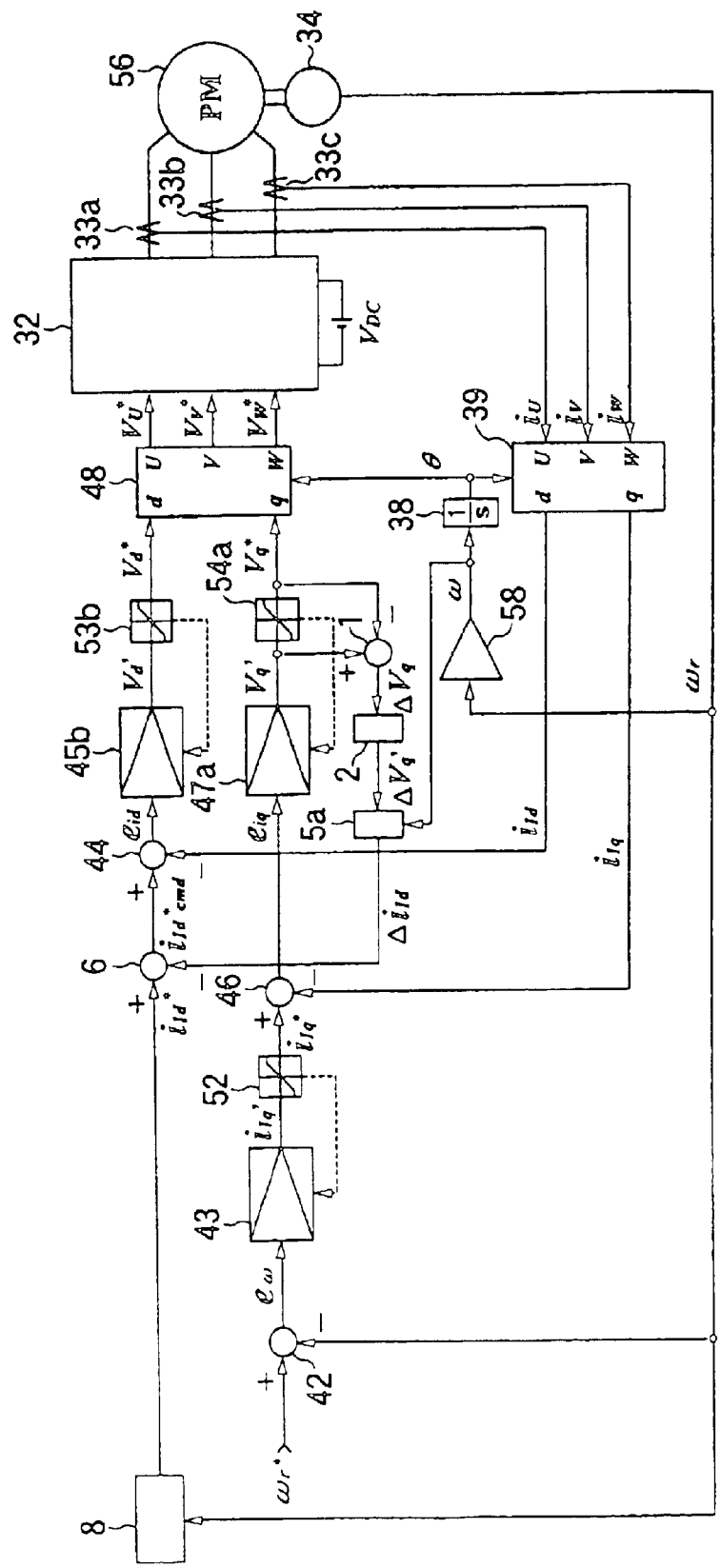
FIG. 7 is a drawing to show the configuration of a speed control apparatus of a permanent-magnet motor according to the third embodiment of the invention.

FIG. 7 is a drawing to show the configuration of a speed control apparatus of a permanent-magnet motor according to the third embodiment of the invention. In FIG. 6, the example is shown wherein the magnetic flux command generation section 55 for outputting a constant value (magnetic flux command $\phi_{2d}^*$) in the speed control apparatus of the induction motor in the first embodiment is replaced with the magnetic flux command generation section 7 for varying the magnetic flux command $\phi_{2d}^*$ in response to the rotation speed $\omega_r$. In FIG. 7, the d-axis current command generation section 57 for outputting an arbitrary d-axis current command $i_{1d}^*$ in the second embodiment is replaced with a d-axis current command generation section 8 for varying d-axis current command $i_{1d}^*$ in response to the rotation speed $\omega_r$.

In control of the permanent-magnet motor, the magnitude of d-axis current command correction amount $\Delta i_{1d}$ fed back can also be lessened to some extent and it is made possible to improve the stability as with the induction motor.

Fourth Embodiment

Figure 8:
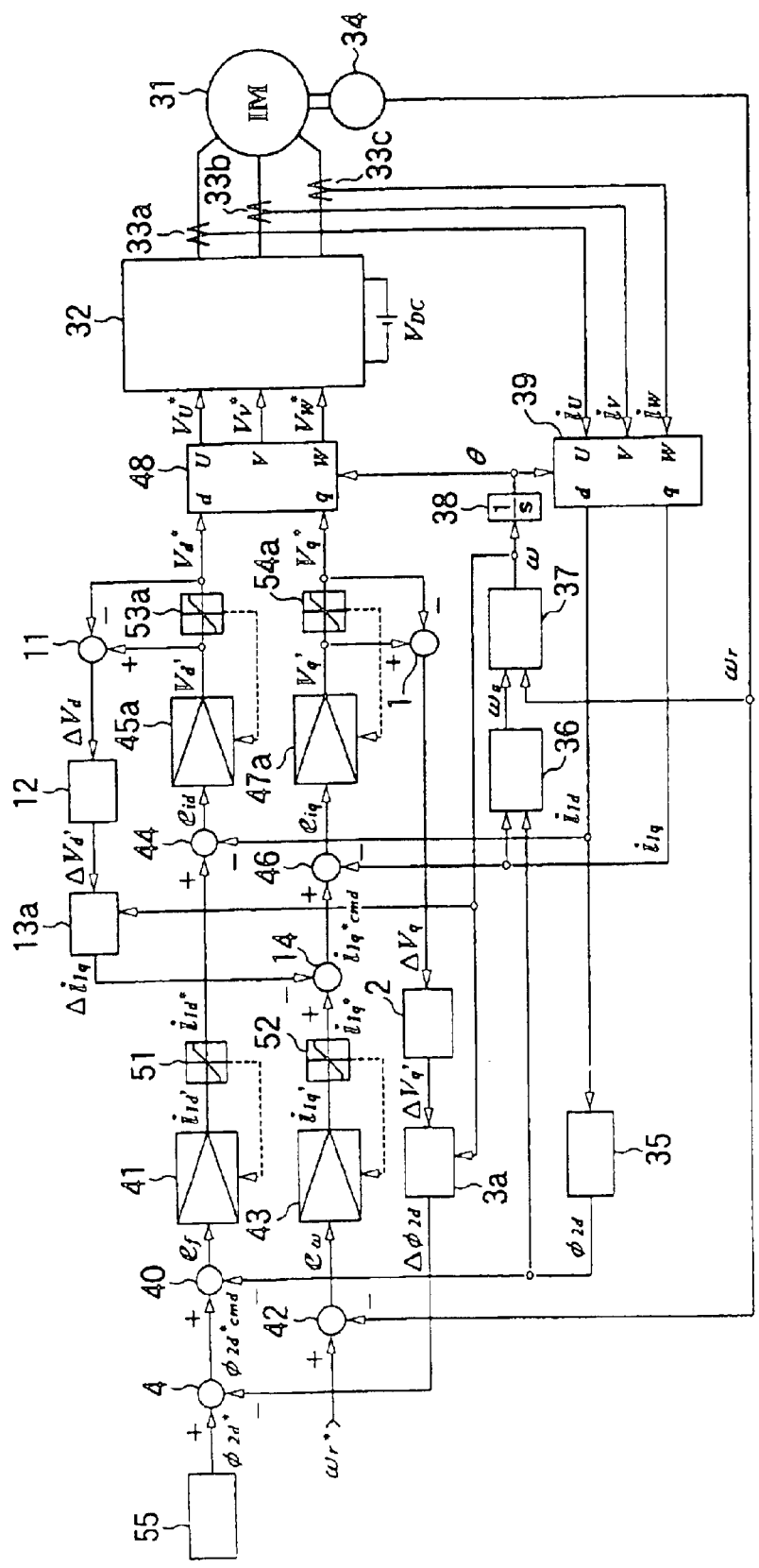
FIG. 8 is a drawing to show the configuration of a speed control apparatus of an induction motor according to a fourth embodiment of the invention.

FIG. 8 is a drawing to show the configuration of a speed control apparatus of an induction motor according to a fourth embodiment of the invention. In the figure, numerals 1, 2, 3a, 4, 31 to 39, 40 to 44, 46, 47a, 48, 51, 52, 54a, and 55 are similar to those in FIG. 1 and will not be discussed again.

Numeral 11 denotes a fourth subtracter for outputting d-axis voltage saturation amount $\Delta V_d$ from d-axis voltage component $V_d'$ and d-axis voltage command $V_d^*$, numeral 12 denotes an integrator for holding the d-axis voltage saturation amount $\Delta V_d$ and outputting held d-axis voltage saturation amount $\Delta V_d'$, numeral 13a denotes a q-axis current command corrector for inputting the held d-axis voltage saturation amount $\Delta V_d'$ and rotation angular speed $\omega$ of dq-axis coordinates and outputting q-axis current command correction amount $\Delta i_{1q}$, and numeral 14 denotes a fifth subtracter for outputting q-axis current correction command $i_{1q}^*{}_{cmd}$ corrected by subtracting the q-axis current command correction amount $\Delta i_{1q}$ from q-axis current command $i_{1q}^*$. Numeral 45a denotes a d-axis current controller for controlling PI so that current deviation $e_{id}$ becomes 0 and outputting the d-axis voltage component $V_d'$, and numeral 53a denotes a d-axis voltage limiter for limiting the d-axis voltage component $V_d'$ within a predetermined range and outputting the d-axis voltage command $V_d^*$.

Figure 9:
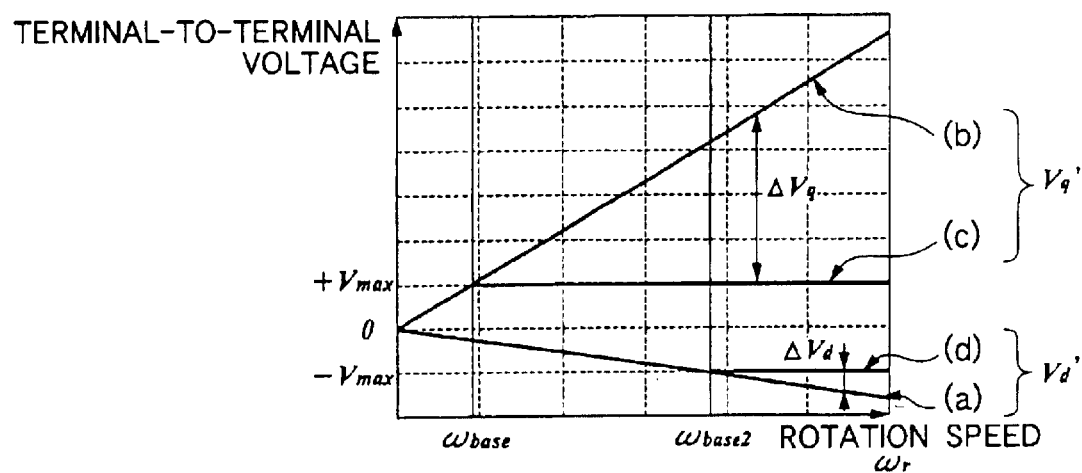
FIG. 9 is a graph plotting d-axis voltage component $V_d'$ and the q-axis voltage component $V_q'$ based on expressions (4) and (5) for finding terminal-to-terminal voltage in a stationary state in the induction motor.

FIG. 9 is a graph plotting d-axis voltage component $V_d'$ and the q-axis voltage component $V_q'$ based on expressions (4) and (5) for finding terminal-to-terminal voltage in a stationary state in the induction motor; (a) indicates a graph of d-axis voltage component $V_d'$ before being corrected according to the fourth embodiment, (b) indicates a graph of q-axis voltage component $V_q'$ before being corrected according to the fourth embodiment, (d) indicates a graph of q-axis voltage component $V_q'$ after being corrected according to the fourth embodiment, and (d) indicates a graph of d-axis voltage component $V_d'$ after being corrected according to the fourth embodiment.

Figure 10:
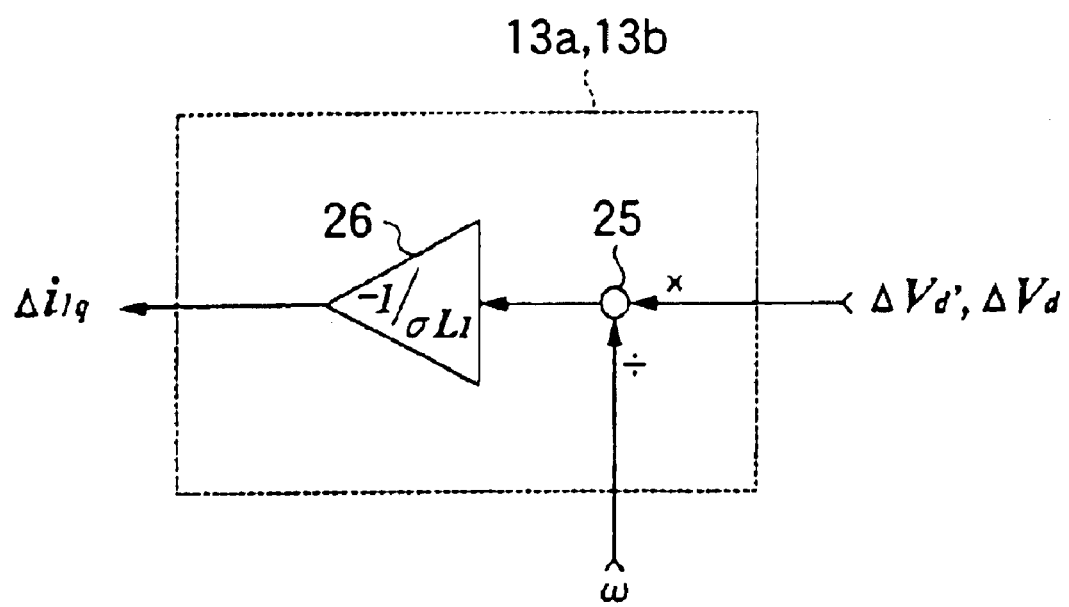
FIG. 10 is a drawing to show to the configuration of a q-axis current command corrector 13a, 13b according to the fourth embodiment of the invention.

FIG. 10 is a drawing to show the configuration of the q-axis current command corrector 13a according to the fourth embodiment of the invention. In the figure, numeral 25 denotes a divider for dividing the held d-axis voltage saturation amount $\Delta V_d'$ by the rotation angular speed $\omega$ of dq-axis coordinates, and numeral 26 denotes a coefficient unit for inputting output of the divider 25 and outputting the q-axis current command correction amount $\Delta i_{1q}$. However, in a magnetic flux command corrector 13b described later, divider 25 divides the d-axis voltage saturation amount $\Delta V_d$ by the rotation angular speed $\omega$ of dq-axis coordinates.

In the first embodiment to the third embodiment, the example wherein the motor is operated in an area wherein the speed is about twice the rated speed (rotation speed $\omega_{base}$) is shown. The fourth embodiment makes it possible to cope with the case where a motor is operated in an area wherein the speed largely exceeds the rated speed.

The operation of the speed control apparatus of the induction motor according to the fourth embodiment will be discussed with FIGS. 8 to 10, FIG. 19, and FIG. 20. When voltage saturation does not occur, the speed control apparatus operates in a similar manner to that in the related art and the operation of the speed control apparatus will not be discussed again.

The terminal-to-terminal voltage of the induction motor in a stationary state is given according to expressions (4) and (5), as described in the related art. A q-axis current limiter 52 is a fixed limiter and its q-axis current limit value is indicated by FIG. 19 (a). Assuming that a q-axis current $i_{1q}$ flows as much as the limit value, $V_d'$ becomes the graph of FIG. 9 (a) according to expression (4). The maximum allowable value of $\phi_{2d}^*$ that can be arbitrarily output from a magnetic flux command generation section 55 is indicated by FIG. 20 (b). Assuming that magnetic flux $\phi_{2d}$ takes the same value as the maximum allowable value, $V_q'$ becomes the graph of FIG. 9 (b) according to expression (5).

As shown in FIGS. 9 (a) and (b), to operate the induction motor in an area wherein the speed largely exceeds the rated speed, the q-axis voltage component $V_q'$ exceeds output limit value $\pm V_{max}$ and voltage saturation occurs in an area wherein the speed is equal to or higher than the rotation speed $\omega_{base}$, and further the d-axis voltage component $V_d'$ also exceeds output limit value $\pm V_{max}$ and voltage saturation occurs in a high-speed area wherein the speed is equal to or higher than rotation speed $\omega_{base2}$. Here, if voltage saturation of the q-axis voltage component $V_q'$ occurs in an area wherein the speed is equal to or higher than the rotation speed $\omega_{base}$ (however, less than the rotation speed $\omega_{base2}$), the speed control apparatus operates in a similar manner to that of the speed control apparatus of the AC motor shown above in each of the first embodiment to the third embodiment, and the operation of the speed control apparatus will not be discussed again. The q-axis voltage component $V_q'$ plotted based on the expression of the terminal-to-terminal voltage is indicated by graph of FIG. 8 (c) and occurrence of voltage saturation of the q-axis component can be suppressed.

Further, if voltage saturation of the d-axis voltage command $V_d^*$ occurs in an area wherein the speed is equal to or higher than the rotation speed $\omega_{base2}$, the d-axis voltage component $V_d'$ is limited to $\pm V_{max}$ by the d-axis voltage limiter 53a. The input/output value of the d-axis voltage limiter 53a is passed through a subtracter 1, whereby deviation (which will be hereinafter referred to as d-axis voltage saturation amount $\Delta V_d$) can be found. The d-axis voltage saturation amount $\Delta V_d$ is a parameter indicating how much voltage is saturated, and corresponds to the $V_d'$ difference indicated by FIGS. 9 (d) and (a).

According to expression (4), $L_1$ and $\sigma$ are parameters of induction motor and are fixed ad the speed $\omega$ needs to be made as commanded because of the speed control apparatus and cannot be corrected. Thus, it is seen that when voltage saturation occurs due to the d-axis voltage component $V_d'$, the q-axis current $i_{1q}$ must be corrected to a lower value to suppress $V_d'$. That is, the correction amount $\Delta i_{1q}$ to the q-axis current is found from the held d-axis voltage saturation amount $\Delta V_d'$ and the q-axis current is corrected to a lower value based on the correction amount, whereby voltage saturation is eliminated.

The relationship between the d-axis voltage saturation amount $\Delta V_d'$ and the q-axis current command correction amount $\Delta i_{1q}$ to eliminate voltage saturation is given according to expression (14) as in expression (4).

$$\Delta V_d' = L_1 \cdot \sigma \cdot \omega \cdot \Delta i_{1q} \qquad (14)$$

If expression (14) is deformed with respect to the q-axis current command correction amount $\Delta i_{1q}$; it results in expression (15).

$$\Delta i_{1q} = -\Delta V_d'/-(L_1 \cdot \sigma \cdot \omega) \qquad (15)$$

Expression (15) becomes an expression for deriving the correction amount $\Delta i_{1q}$ to the q-axis current from the held d-axis voltage saturation amount $\Delta V_d'$ and corresponds to the q-axis current command corrector 13a in FIG. 8 and a specific block diagram thereof is shown in FIG. 10.

The q-axis current command correction amount $\Delta i_{1q}$ thus obtained is input to the subtracter 8 and the q-axis current command $i_{1q}^*$ is corrected to a lower value of the q-axis current correction command $i_{1q}^*_{cmd}$. According to the correction, the graph of the d-axis voltage component $V_d'$ plotted based on the theoretical expression of the terminal-to-terminal voltage becomes FIG. 9 (d) and occurrence of voltage saturation of the d-axis component can be suppressed.

As described above, according to the fourth embodiment, if d-axis voltage saturation occurs, the degree of the voltage saturation is detected as the d-axis voltage saturation amount, and the optimum q-axis current command correction amount for eliminating the voltage saturation is determined in response to the d-axis voltage saturation amount and is fed back to correct the q-axis current command.

When the correction amount is determined, the speed of the motor is considered. Thus, if the speed changes rapidly, etc., the optimum correction amount can always be obtained and it is possible to suppress occurrences of voltage saturation.

To operate the AC motor in an area wherein the speed largely exceeds the rated speed, stable control can also be performed independently of change in the conditions of load and bus voltage, and the capabilities of the PWM inverter can always be exploited at the maximum, so that it is made possible to increase output torque, etc.

Figure 11:
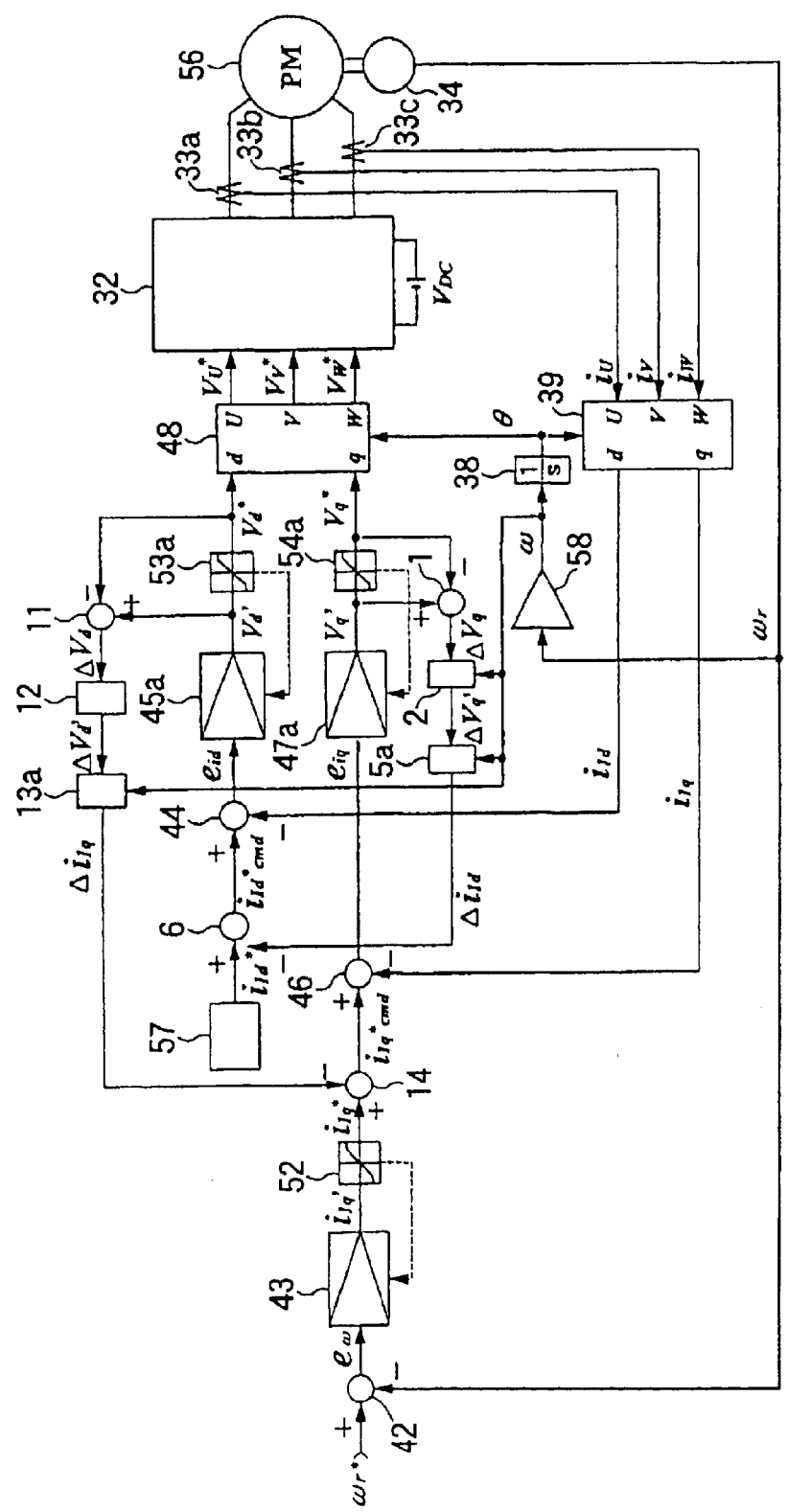
FIG. 11 is a drawing to show the configuration of a speed control apparatus of a permanent-magnet motor according to the fourth embodiment of the invention.

FIG. 11 is a drawing to show the configuration of a speed control apparatus of a permanent-magnet motor according to the fourth embodiment of the invention. In the figure, numerals 1, 1, 5a, 6, 32 to 34, 38, 39, 42 to 44, 46, 47a, 48, 54a, and 56 to 58 are similar to those in FIG. 4 shown in the second embodiment and will not be discussed again. Numeral 11 denotes a fourth subtracter for outputting d-axis voltage saturation amount $\Delta V_d$ from d-axis voltage component $V_d'$ and d-axis voltage command $V_d^*$, numeral 12 denotes an integrator for holding the d-axis voltage saturation amount $\Delta V_d$ and outputting held d-axis voltage saturation amount $\Delta V_d'$, numeral 13a denotes a q-axis current command corrector for inputting the held d-axis voltage saturation amount $\Delta V_d'$ and rotation angular speed $\omega$ of dq-axis coordinates and outputting q-axis current command correction amount $\Delta i_{1q}$, and numeral 14 denotes a fifth subtracter for outputting q-axis current correction command $i_{1q}{}^*{}_{cmd}$ corrected by subtracting the q-axis current command correction amount $\Delta i_{1q}$ from q-axis current command $i_{1q}{}^*$. Numeral 45a denotes a d-axis current controller for controlling PI so that current deviation $e_{id}$ becomes 0 and outputting the d-axis voltage component $V_d{}'$, and numeral 53a denotes a d-axis voltage limiter for limiting the d-axis voltage component $V_d{}'$ within a predetermined range and outputting the d-axis voltage command $V_d{}^*$.

FIG. 11 shows an example of using the fourth embodiment of the invention for the speed control apparatus of the permanent-magnet motor, and the operation of the speed control apparatus is similar to that of the speed control apparatus of the induction motor in FIG. 8 and will not be discussed again.

Fifth Embodiment

Figure 12:
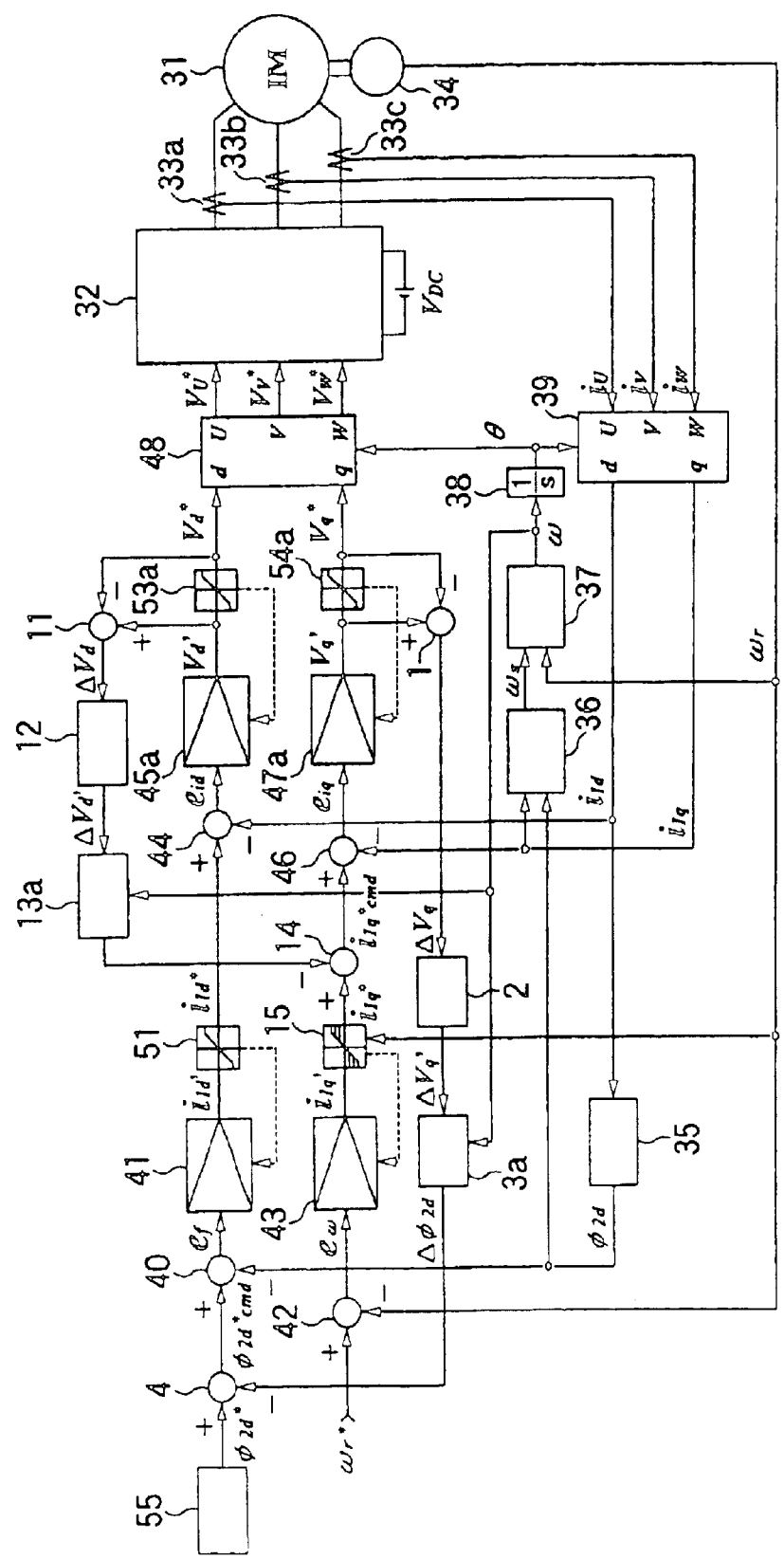
FIG. 12 is a drawing to show the configuration of a speed control apparatus of an induction motor according to a fifth embodiment of the invention.

FIG. 12 is a drawing to show the configuration of a speed control apparatus of an induction motor according to a fifth embodiment of the invention. In the figure, numerals 1, 2, 3a, 4, 11, 12, 13a, 14, 31 to 39, 40 to 44, 45a, 46, 47a, 48, 51, 53a, 54a, and 55 are similar to those in FIG. 8 and will not be discussed again. Numeral 15 denotes a q-axis current limiter for inputting rotation speeds $\omega_r$ of an induction motor 31 and varying a limit value in response to the rotation speed $\omega_r$.

The operation of the speed control apparatus of the AC motor according to the fifth embodiment will be discussed with FIGS. 12 and 9.

In the fourth embodiment, if d-axis voltage saturation occurs, the degree of the voltage saturation is detected as the d-axis voltage saturation amount $\Delta V_d$, and the optimum q-axis current command correction amount $\Delta i_{1q}$ for eliminating the voltage saturation is determined in response to the d-axis voltage saturation amount and the q-axis current command correction amount $\Delta i_{1q}$ is fed back to correct the q-axis current command $I_{1q}{}^*$. Here, as shown in FIG. 9 for the fourth embodiment, as the rotation speed $\omega_r$ increases, the d-axis voltage saturation amount $\Delta V_d$ grows. However, to perform stable control, it is not much preferred that the fed-back correction amount becomes too large.

In the fourth embodiment, the result of subtracting the q-axis current command correction amount $\Delta i_{1q}$ fed back as the correction amount from the q-axis current command $i_{1q}{}^*$ output from the q-axis current limiter 52 becomes the final q-axis current correction command $i_{1q}{}^*{}_{cmd}$. To suppress occurrence of voltage saturation, the q-axis current correction command $i_{1q}{}^*{}_{cmd}$ may be small for an increase in the rotation speed $\omega_r$.

However, the q-axis current limiter 52 in the fourth embodiment is a fixed limiter and always limits with a constant value. Thus, when the rotation speed $\omega_r$ increases and the q-axis current command is output fully up to the limit value, unless the q-axis current command correction amount $\Delta i_{1q}$ is increased, it becomes impossible to suppress occurrence of voltage saturation.

In the fifth embodiment, the q-axis current limiter 52 of a fixed limiter in the fourth embodiment is replaced with the q-axis current limiter 15 of a variable limiter for varying the limit value in response to the rotation speed $\omega_r$. For example, the limit value is varied in such a manner that the limit value is weakened in inverse proportion to an increase in the rotation speed $\omega_r$.

The q-axis current command $i_{1q}{}^*$ output from the q-axis current limiter 15 is variably limited for an increase in the rotation speed $\omega_r$, whereby the d-axis voltage saturation amount $\Delta V_d$ can be lessened, and the q-axis current command correction amount $\Delta i_{1q}$ feedback as the correction amount can be suppressed.

The control example of the induction motor has been shown. However, in the speed control apparatus of the permanent-magnet motor in FIG. 11, the q-axis current limiter 52 of a fixed limiter is replaced with the q-axis current limiter 15 of a variable limiter for varying the limit value in response to the rotation speed $\omega_r$, whereby stability can also be improved in control of the permanent-magnet motor.

As described above, according to the fifth embodiment, the q-axis current limiter 15 is made a variable limiter for varying the limit value in response to the rotation speed $\omega_r$, so that the magnitude of the d-axis voltage saturation amount $\Delta V_d$ can be lessened to some extent and it is made possible to improve the stability of control of the AC motor.

It is also possible to use the fifth embodiment and the third embodiment in combination, lessen both the d-axis voltage saturation amount $\Delta V_d$ and the q-axis voltage saturation amount $\Delta V_q$ to some extent, and remarkably improve the stability of control of the AC motor.

Sixth Embodiment

Figure 13:
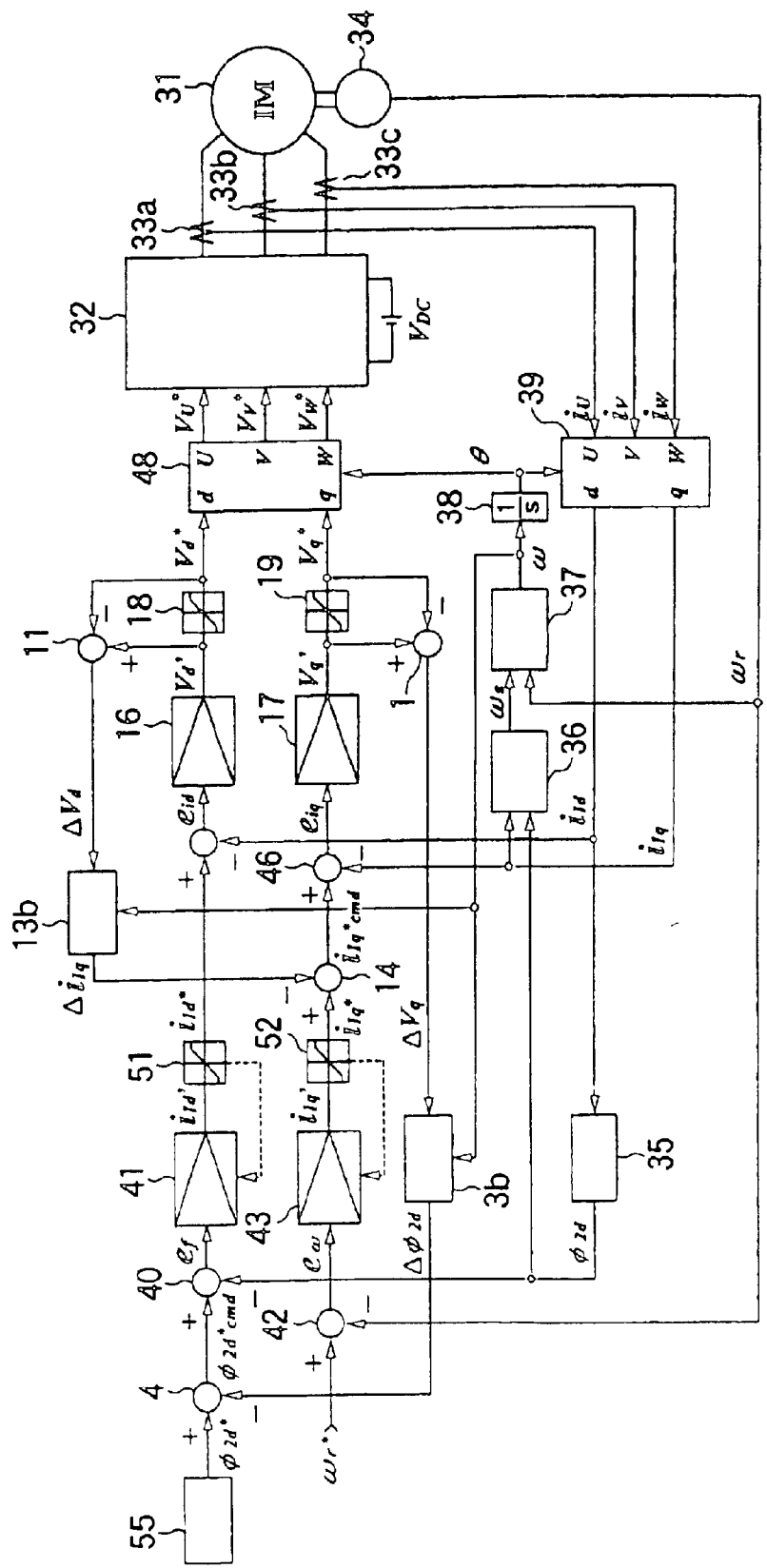
FIG. 13 is a drawing to show the configuration of a speed control apparatus of an induction motor according to a sixth embodiment of the invention.

FIG. 13 is a drawing to show the configuration of a speed control apparatus of an induction motor according to a sixth embodiment of the invention. In the figure, numerals 1, 4, 11, 14, 31 to 39, 40 to 44, 46, 48, 51, 52, and 55 are similar to those in FIG. 8 and will not be discussed again. Numeral 3b denotes a magnetic flux command corrector for outputting magnetic flux command correction amount $\Delta\phi_{2d}$ from q-axis voltage saturation amount $\Delta V_q$ and rotation angular speed $\omega$ of dq-axis coordinates, numeral 13b denotes a q-axis current command corrector for inputting d-axis voltage saturation amount $\Delta V_d$ and rotation angular speed $\omega$ of dq-axis coordinates and outputting q-axis current command correction amount $\Delta i_{1q}$, numeral 16 denotes a d-axis current controller for controlling PI so that current deviation $e_{id}$ becomes 0 and outputting d-axis voltage component $V_d{}'$, numeral 17 denotes a q-axis current controller for controlling PI so that current deviation $e_{iq}$ becomes 0 and outputting q-axis voltage component $V_q{}'$, numeral 18 denotes a d-axis voltage limiter for limiting the d-axis voltage component $V_d{}'$ within a predetermined range and outputting d-axis voltage command $V_d{}^*$, and numeral 19 denotes a q-axis voltage limiter for limiting the q-axis voltage component $V_q{}'$ within a predetermined range and outputting q-axis voltage command $V_q{}^*$.

Figure 14:
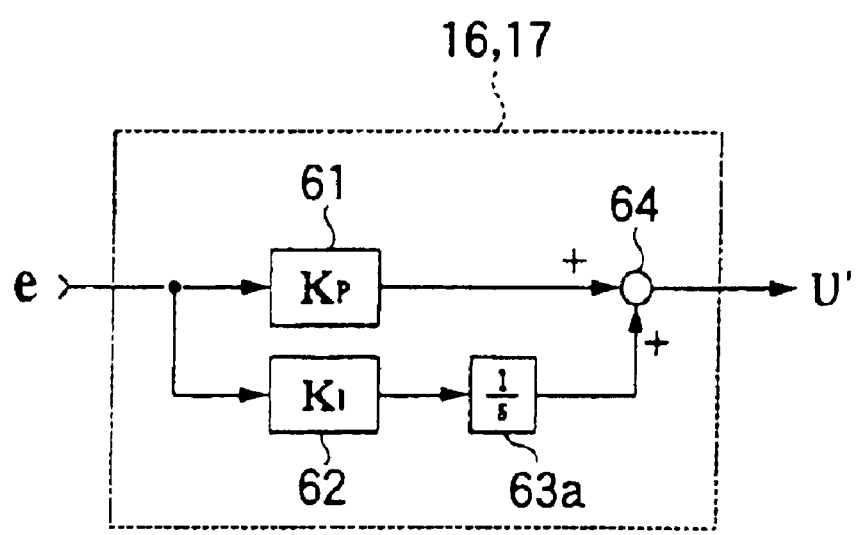
FIG. 14 is a drawing to show the configuration of a PI controller of a d-axis current controller 16, a q-axis current controller 17, etc., in FIG. 13.
Figure 17:
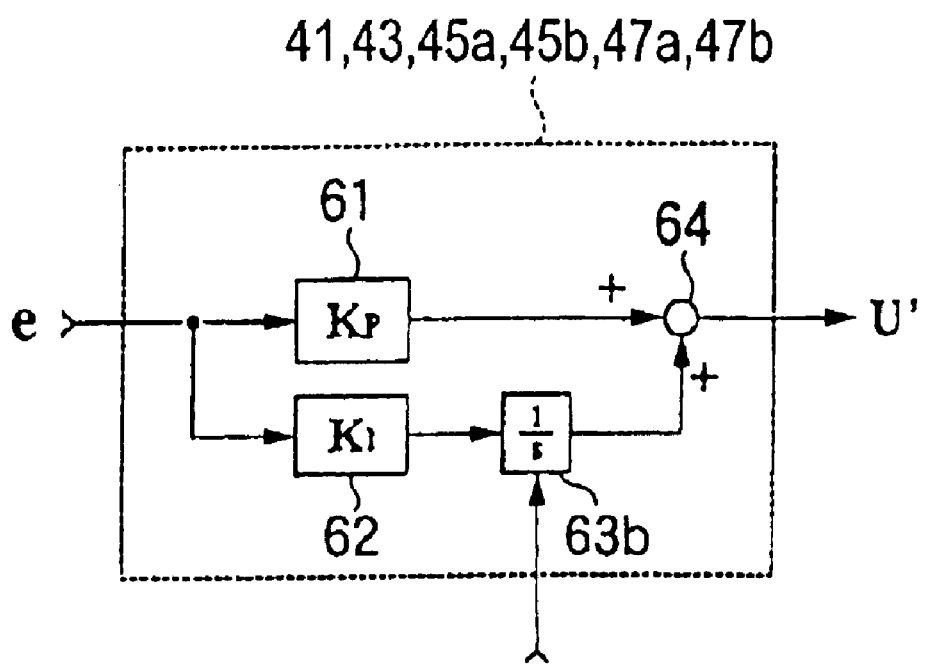
FIG. 17 is a drawing to show the configuration of a PI controller of a magnetic flux controller 41, a speed controller 43, a d-axis current controller 45b, a q-axis current controller 47b, etc., in FIG. 16.
Figure 18:
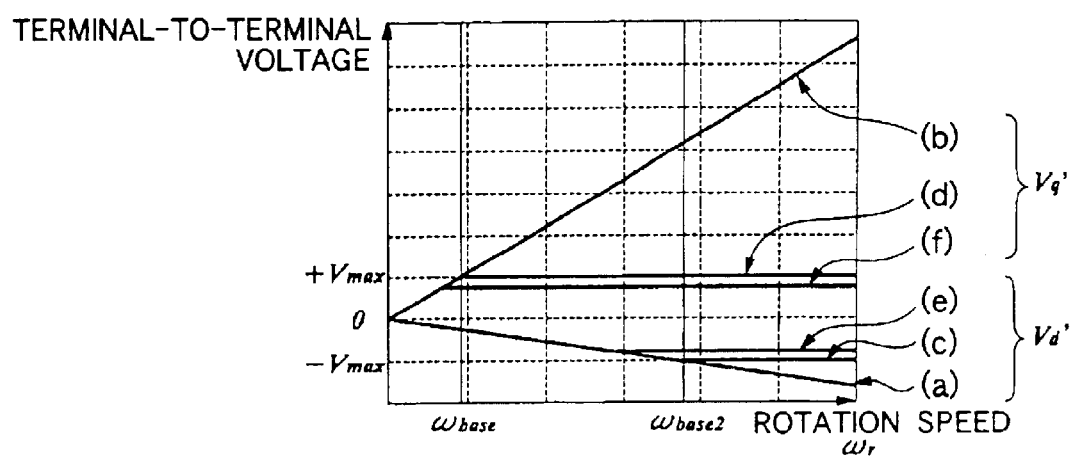
FIG. 18 is a graph plotting d-axis voltage component $V_d'$ and q-axis voltage component $V_q'$ based on expressions for finding terminal-to-terminal voltage in a stationary state in the induction motor described later.

FIG. 14 is a drawing to show the configuration of a PI controller of a current controller 16, 17 used in the speed control apparatus of the induction motor according to the sixth embodiment of the invention. In the figure, numerals 61, 62, and 64 are similar to those in FIG. 17 of the related art example and will not be discussed again. Numeral 63a denotes an integrator.

Letter e denotes deviation input to the PI controller and U' denotes control input output from the PI controller. As for the d-axis current controller 16, e corresponds to the current deviation $e_{id}$ between d-axis current command $i_{1d}{}^*$ and d-axis current $i_{1d}$, and U' corresponds to the d-axis voltage component $V_d{}'$. As for the q-axis current controller 17, e corresponds to current deviation $e_{iq}$ between the q-axis current command $i_{1q}{}^*$ and q-axis current $i_{1q}$, and U' corresponds to the q-axis voltage component $V_q{}'$.

If the controller input U' exceeds the limit value of the d-axis voltage limiter 53a, 53b, the q-axis voltage limiter 54a, 54b, the d-axis current controller 45a, 45b, the q-axis current controller 47a, 47b used in the related art example and the first embodiment to the fifth embodiment is configured for stopping the calculation of the integrator 63 in the current controller for controlling PI and thus the integrator 12 for holding the d-axis voltage saturation amount $\Delta V_d$ and the integrator 2 for holding the q-axis voltage saturation amount $\Delta V_q$ are added. However, even if the control input U' exceeds the limit value of the d-axis voltage limiter 18, the q-axis voltage limiter 19, the d-axis current controller 16 and the q-axis current controller 17 used in the sixth embodiment cause each a value equal to or greater than the limit value to be held in the internal integrator 63a without stopping the calculation of the integrator 63a in the current controller for controlling PI.

In the sixth embodiment, the d-axis current controller 45a and the q-axis current controller 47a in the fourth embodiment are replaced with the d-axis current controller 16 and the q-axis current controller 17, the integrator 12 for holding the d-axis voltage saturation amount $\Delta V_d$ and the integrator 2 for holding the q-axis voltage saturation amount $\Delta V_q$ are eliminated, the magnetic flux command corrector 3a for outputting the magnetic flux command correction amount $\Delta \phi_{2d}$ from the q-axis voltage saturation amount $\Delta V_q'$ held in the integrator 2 and the rotation angular speed $\omega$ of dq-axis coordinates is replaced with the magnetic flux command corrector 3b for outputting the magnetic flux command correction amount $\Delta \phi_{2d}$ from the q-axis voltage saturation amount $\Delta V_q$ and the rotation angular speed $\omega$ of dq-axis coordinates, and the q-axis current command corrector 13a for inputting the d-axis voltage saturation amount $\Delta V_d'$ held in the integrator 12 and the rotation angular speed $\omega$ of dq-axis coordinates and outputting the q-axis current command correction amount $\Delta i_{1q}$ is replaced with the q-axis current command corrector 13b for inputting the d-axis voltage saturation amount $\Delta V_d$ and the rotation angular speeds $\omega$ of dq-axis coordinates and outputting the q-axis current command correction amount $\Delta i_{1q}$, whereby equal operation is performed. The operation of the speed control apparatus is similar to that of the speed control apparatus of the fourth embodiment and therefore will not be discussed again.

The example wherein the current controllers 45a and 47a in FIG. 8 are replaced with the current controllers 16 and 17 has been described, but the current controllers 45a and 47a in FIG. 12 may be replaced with the current controllers 16 and 17. The current controller 47a in FIG. 6 may be replaced with the current controller 17.

The d-axis current controller 16 and the q-axis current controller 17 of the PI controllers designed for not stopping the calculation of the integrators 63a in the PI controller even if the control input U' exceeds the limit value are used, so that occurrence of voltage saturation can be suppressed according to the simple configuration.

Figure 15:
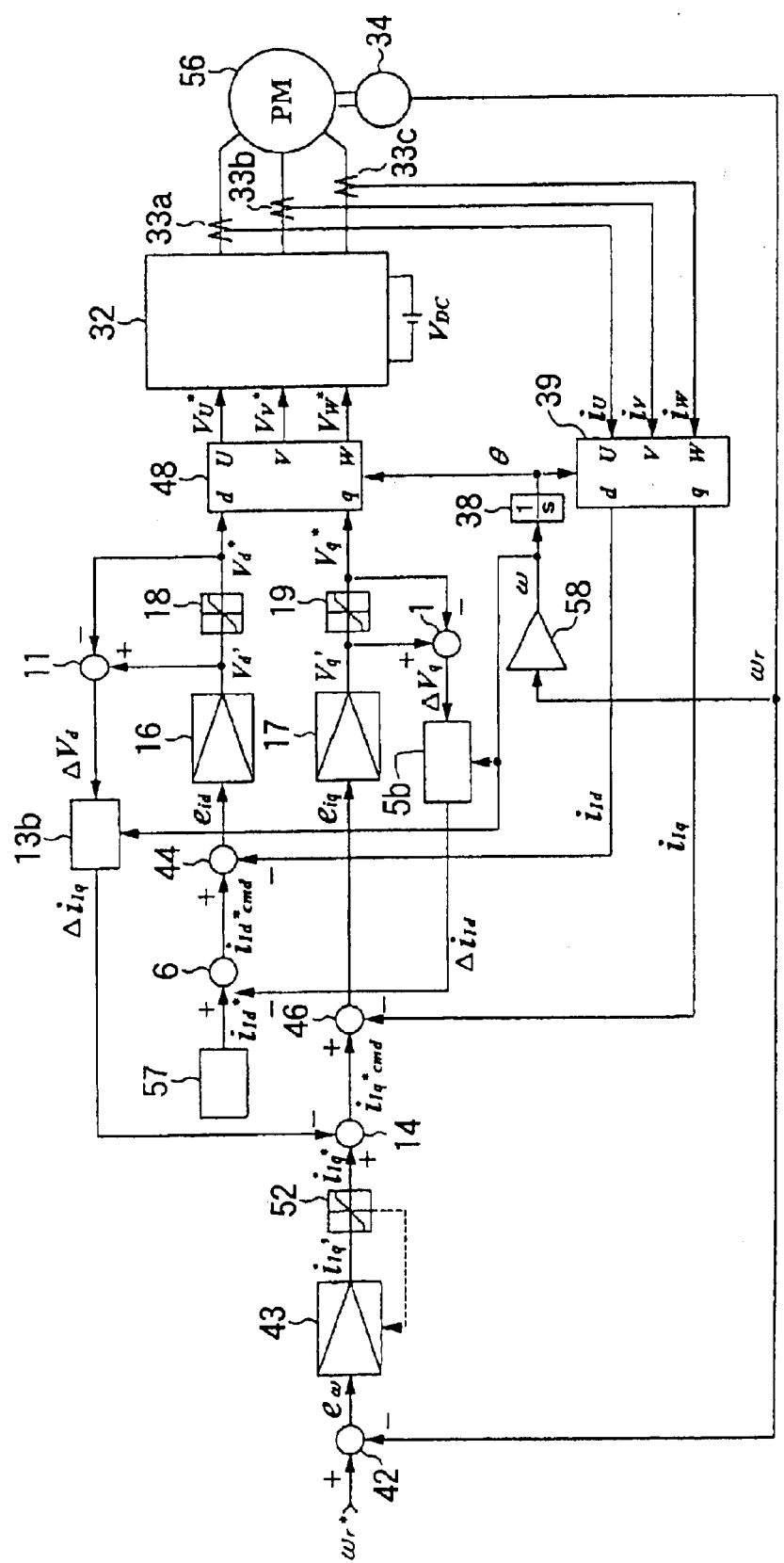
FIG. 15 is a drawing to show the configuration of a speed control apparatus of a permanent-magnet motor according to the sixth embodiment of the invention.

FIG. 15 is a drawing to show the configuration of a speed control apparatus of a permanent-magnet motor according to the sixth embodiment of the invention. In the figure, numerals 1, 11, 32 to 34, 38, 39, 42 to 44, 46, 48, 51, 52, and 56 to 58 are similar to those in FIG. 11 and will not be discussed again. Numeral 5b denotes a d-axis current command corrector for inputting q-axis voltage saturation amount $\Delta V_q$ and rotation angular speed $\omega$ of dq-axis coordinates and outputting d-axis current command correction amount $\Delta i_{1d}$, numeral 13b denotes a q-axis current command corrector for inputting d-axis voltage saturation amount $\Delta V_d$ and rotation angular speed $\omega$ of dq-axis coordinates and outputting q-axis current command correction amount $\Delta i_{1q}$, numeral 16 denotes a d-axis current controller for controlling PI so that current deviation $e_{id}$ becomes 0 and outputting d-axis voltage component $V_d'$, numeral 17 denotes a q-axis current controller for controlling PI so that current deviation $e_{iq}$ becomes 0 and outputting q-axis voltage component $V_q'$, numeral 18 denotes a d-axis voltage limiter for limiting the d-axis voltage component $V_d'$ within a predetermined range and outputting d-axis voltage command $V_d^*$, and numeral 19 denotes a q-axis voltage limiter for limiting the q-axis voltage component $V_q'$ within a predetermined range and outputting q-axis voltage command $V_q^*$.

In FIG. 15, the d-axis current controller 45a and the q-axis current controller 47a in FIG. 11 are replaced with the d-axis current controller 16 and the q-axis current controller 17 each for causing a value equal to or greater than the limit value to be held in the internal integrator 63a without stopping the calculation of the integrator 63a in the current controller for controlling PI even if the control input U' exceeds the limit value of the d-axis voltage limiter 18, the q-axis voltage limiter 19, the integrator 12 for holding the d-axis voltage saturation amount $\Delta V_d$ and the integrator 2 for holding the q-axis voltage saturation amount $\Delta V_q$ are eliminated, the magnetic flux command corrector 3a for outputting the magnetic flux command correction amount $\Delta \phi_{2d}$ from the q-axis voltage saturation amount $\Delta V_q'$ held in the integrator 2 and the rotation angular speed $\omega$ of the dq-axis coordinates is replaced with the magnetic flux command corrector 3b for outputting the magnetic flux command correction amount $\Delta \phi_{2d}$ from the q-axis voltage saturation amount $\Delta V_q$ and the rotation angular speed $\omega$ of the dq-axis coordinates, and the q-axis current command corrector 13a for inputting the d-axis voltage saturation amount $\Delta V_d'$ held in the integrator 12 and the rotation angular speed $\omega$ of dq-axis coordinates and outputting the q-axis current command correction amount $\Delta i_{1q}$ is replaced with the q-axis current command corrector 13b for inputting the d-axis voltage saturation amount $\Delta V_d$ and the rotation angular speed $\omega$ of dq-axis coordinates and outputting the q-axis current command correction amount $\Delta i_{1q}$, whereby equal operation is performed. The operation of the speed control apparatus is similar to that of the speed control apparatus of the fourth embodiment and therefore will not be discussed again.

The example wherein the current controllers 45a and 47a in FIG. 11 are replaced with the current controllers 16 and 17 has been described, but the current controller 47a in FIG. 4 may be replaced with the current controller 17.

The d-axis current controller 16 and the q-axis current controller 17 of the PI controllers designed for not stopping the calculation of the integrator 63a in the PI controller even if the control input U' exceeds the limit value are used, so that occurrence of voltage saturation can be suppressed according to the simple configuration.

INDUSTRIAL APPLICABILITY

As described above, if voltage saturation occurs in the speed control apparatus of the AC motor, the optimum correction amount for eliminating the voltage saturation is found based on the voltage saturation amount detected as the voltage saturation degree and is fed back to correct each command, so that the speed control apparatus is suited for use in application wherein high-speed operation at the rated speed or higher is performed or rapid speed change is made.

What is claimed is:

1. A speed control apparatus of an AC motor having current controllers for performing proportional integration control of an excitation component current and a torque compound current of two components on rotating Cartesian two-axis coordinates into which a current of the AC motor is separated, said speed control apparatus comprising:

a torque component voltage limiter for limiting a torque component voltage component output from torque component current controller for performing proportional integration control of the torque component current so that the torque component voltage component becomes equal to or less than a predetermined value;

a first subtracter for finding a torque component voltage saturation amount from the torque component voltage component output from said torque component current controller and a torque component voltage command output from said torque component voltage limiter;

a first integrator for holding the torque component voltage saturation amount;

a magnetic flux command corrector for outputting a magnetic fluid command correction amount from the held torque component voltage saturation amount and rotation angular speed of Cartesian two-axis coordinates; and a second subtracter for subtracting the magnetic flux command correction amount from a magnetic flux command and outputting a magnetic flux correction command.

2. The speed control apparatus of an AC motor as claimed in claim 1, wherein rotation speed of said AC motor is input to a magnetic flux command generation section for generating a magnetic flux command, and a magnetic flux command is generated in response to the rotation speed of said AC motor.

3. The speed control apparatus of an AC motor as claimed in claim 1 comprising:

an excitation component voltage limiter for limiting an excitation component voltage component output from excitation component current controller for performing proportional integration control of the excitation component current so that the excitation component voltage component becomes equal to or less than a predetermined value;

a fourth subtracter for finding the excitation component voltage component output from said excitation component current controller and an excitation component voltage saturation amount output from said excitation component voltage limiter;

a second integrator for holding the excitation component voltage saturation amount;

an excitation component current command corrector for outputting a torque component current command correction amount from the held excitation component voltage saturation amount and rotation angular speed of Cartesian two-axis coordinates; and a fifth subtracter for subtracting the torque component current command correction amount from a torque component current command and outputting a torque component current correction command.

4. The speed control apparatus of an AC motor as claimed in claim 3, wherein in a torque component current limiter for limiting a torque component current command output from a speed controller for performing proportional integration control of speed deviation between a speed command and the rotation speed of said AC motor so that the torque component current command becomes equal to or less than a predetermined value, the limit value for limiting the torque component current command is varied in response to the rotation speed of said AC motor.

5. A speed control apparatus of an AC motor having current controllers for performing proportional integration control of an excitation component current and a torque component current of two components on rotating Cartesian two-axis coordinates into which a current of the AC motor is separated, said speed control apparatus comprising:

a torque component voltage limiter for limiting a torque component voltage component output from torque component current controller for performing proportional integration control of the torque component current so that the torque component voltage component becomes equal to or less than a predetermined value;

a first subtracter for finding a torque component voltage saturation amount from the torque component voltage component output from said torque component current controller and a torque component voltage command output from said torque component voltage limiter;

a first integrator for holding the torque component voltage saturation amount;

an excitation component current command corrector for outputting an excitation component current command correction amount from the held torque component voltage saturation amount and rotation angular speed of Cartesian two-axis coordinates; and a third subtracter for subtracting the excitation component current command correction amount from an excitation component current command and outputting an excitation component current command correction command.

6. The speed control apparatus of an AC motor as claimed in claim 2, wherein rotation speed of said AC motor is input to an excitation component current command generation section for generating an excitation component current command, and an excitation component current command is generated in response to the rotation speed of said AC motor.

7. The speed control apparatus of an AC motor as claimed in claim 5 comprising:

an excitation component voltage limiter for limiting an excitation component voltage component output from excitation component current controller for performing proportional integration control of the excitation component current so that the excitation component voltage component becomes equal to or less than a predetermined value;

a fourth subtracter for finding the excitation component voltage component output from said excitation component current controller and an excitation component voltage saturation amount output from said excitation component voltage limiter;

a second integrator for holding the excitation component voltage saturation amount;

an excitation component current command corrector for outputting a torque component current command correction amount from the held excitation component voltage saturation amount and rotation angular speed of Cartesian two-axis coordinates; and a fifth subtracter for subtracting the torque component current command correction amount from a torque component current command and outputting a torque component current correction command.

8. The speed control apparatus of an AC motor as claimed in claim 7, wherein in a torque component current limiter for limiting a torque component current command output from a speed controller for performing proportional integration control of speed deviation between a speed command and the rotation speed of said AC motor so that the torque component current command becomes equal to or less than a predetermined value, the limit value for limiting the torque component current command is varied in response to the rotation speed of said AC motor.

9. A speed control apparatus of an AC motor having current controllers for performing proportional integration control of an excitation component current and a torque component current of two components on rotating Cartesian two-axis coordinates into which a current of said AC motor is separated;

said speed control apparatus comprising:

a torque component current controller for performing proportional integration control of the torque component current is configured so as to continue calculation of an internal integrator even if torque component voltage component becomes saturated;

a torque component voltage limiter for limiting the torque component voltage component output from said torque component current controller for performing proportional integration control of the torque component current so that the torque component voltage component becomes equal to or less than a predetermined value;

a first subtracter for finding a torque component voltage saturation amount from the torque component voltage component output from said torque component current controller and a torque component voltage command output from said torque component voltage limiter;

a magnetic flux command corrector for outputting a magnetic flux command correction amount from the torque component voltage subtraction amount and rotation angular speed of Cartesian two-axis coordinates; and a second subtracter for subtracting the magnetic flux command correction amount from a magnetic flux command and outputting a magnetic flux correction command.

10. The speed control apparatus of an AC motor as claimed in claim 9, wherein rotation speed of said AC motor is input to a magnetic flux command generation section for generating a magnetic flux command, and a magnetic flux command is generated in response to the rotation speed of said AC motor.

11. The speed control apparatus of an AC motor as claimed in claim 9, said speed control apparatus comprising:

an excitation component current controller for performing proportional integration control of the excitation component is configured so as to continue calculation of an internal integrator even if excitation component voltage component becomes saturated;

an excitation compound voltage limiter for limiting the excitation compound voltage component output from said excitation component current controller for performing proportional integration control of the excitation component current so that the excitation component voltage component becomes equal to or less than a predetermined value;

a fourth subtracter for finding the excitation component voltage component output from said excitation component current controller and an excitation component voltage saturation amount output from said excitation component voltage limiter;

an excitation component current command corrector for outputting a torque component current command correction amount from the excitation component voltage saturation amount and rotation angular speed of Cartesian two-axis coordinates; and a fifth subtracter for subtracting the torque component current command correction amount from a torque component current command and outputting a torque component current correction command.

12. The speed control apparatus of an AC motor as claimed in claim 11, wherein in a torque component current limiter for limiting a torque component current command output from a speed controller for performing proportional integration control of speed deviation between a speed command and the rotation speed of said AC motor so that the torque component current command becomes equal to or less than a predetermined value, the limit value for limiting the torque component current command is varied in response to the rotation speed of said AC motor.

13. A speed control apparatus of an AC motor having current controllers for performing proportional integrating control of an excitation component current and a torque component current of two components on rotating Cartesian two-axis coordinates into which a current of said AC motor is separated, said speed control apparatus comprising:

a torque component current controller for performing proportional integration control of the torque component current is configured so as to continue calculation of an internal integrator even if the torque component voltage component becomes saturated;

a torque component value limiter for limiting a torque component voltage component output from torque component current controller for performing proportional integration control of the torque component current so that the torque component voltage component becomes equal to or less than a predetermined value;

a first subtracter for finding a torque component voltage saturation amount from the torque component voltage component output from said torque component current controller and a torque component voltage command output from said torque component voltage limiter;

an excitation component current command corrector for outputting an excitation component current command correction amount from the torque component voltage saturation amount and rotation angular speed of Cartesian two-axis coordinates; and a third subtracter for subtracting the excitation component current command correction amount from an excitation component current command and outputting an excitation component current command correction command.

14. The speed control apparatus of an AC motor as claimed in claim 13, wherein rotation speed of said AC motor is input to an excitation component current command generation section for generating an excitation component current command, and an excitation component current command is generated in response to the rotation speed of said AC motor.

15. The speed control apparatus of an AC motor as claimed in claim 13, said speed control apparatus comprising:

an excitation component current controller for performing proportional integration control of the excitation component current is configured so as to continue calculation of an internal integrator even if excitation component voltage component becomes saturated;

an excitation component voltage limiter for limiting an excitation component voltage component output from excitation component current controller for performing proportional integration control of the excitation component current so that the excitation component voltage component becomes equal to or less than a predetermined value;

a fourth subtracter for finding the excitation component voltage component output from said excitation component current controller and an excitation component voltage saturation amount output from said excitation component voltage limiter;

an excitation component current command corrector for outputting a torque component current command correction amount from the excitation component voltage saturation amount and rotation angular speed of Cartesian two-axis coordinates; and a fifth subtracter for subtracting the torque component current command correction amount from a torque component current command and outputting a torque component current correction command.

16. The speed control apparatus of an AC motor as claimed in claim 15, wherein in a torque component current limiter for limiting a torque component current command output from a speed controller for performing proportional integration control of speed deviation between a speed command and the rotation speed of said AC motor so that the torque component current command becomes equal to or less than a predetermined value, the limit value for limiting the torque component current command is varied in response to the rotation speed of said AC motor.

* * * * *